(12) United States Patent
Yokoi

(10) Patent No.: US 6,396,053 B1
(45) Date of Patent: May 28, 2002

(54) SCANNING OPTICAL MICROSCOPE APPARATUS CAPABLE OF DETECTING A PLURALITY OF FLOURESCENT LIGHT BEAMS

(75) Inventor: Eiji Yokoi, Hachioji (JP)

(73) Assignee: Olympus Optical Co., Tokyo (JP)

( * ) Notice: Subject to any disclaimer, the term of this patent is extended or adjusted under 35 U.S.C. 154(b) by 0 days.

(21) Appl. No.: 09/431,095

(22) Filed: Nov. 1, 1999

(30) Foreign Application Priority Data

Nov. 2, 1998 (JP) .......................................... 10-312088
Mar. 17, 1999 (JP) .......................................... 11-072544

(51) Int. Cl.$^7$ .............................................. G02B 21/00
(52) U.S. Cl. ...................................... 250/234; 250/226
(58) Field of Search ................................ 250/234, 235, 250/236, 226; 359/223, 235, 368

(56) References Cited

U.S. PATENT DOCUMENTS

| 5,061,049 A | 10/1991 | Hornbeck |
| 5,504,575 A | 4/1996 | Stafford |
| 5,751,417 A | 5/1998 | Uhl |

FOREIGN PATENT DOCUMENTS

| DE | 43 30 347 | 4/1998 |
| JP | 8-043739 | 2/1996 |
| WO | WO95/07447 | 3/1995 |

*Primary Examiner*—John R. Lee
*Assistant Examiner*—Bradford Hill
(74) *Attorney, Agent, or Firm*—Pillsbury Winthrop LLP

(57) ABSTRACT

A scanning optical microscope apparatus includes a laser light source, an objective lens for condensing a laser beam emitted from the laser light source on a specimen, a scanning device for relatively scanning the specimen with a condensed laser spot, an imaging optical system for imaging light emanating from the specimen, a confocal stop placed at the focal point of the imaging optical system, and a plurality of photodetectors for detecting the light from the specimen, passing through the confocal stop. In this case, the scanning optical microscope apparatus includes a spectrum decomposing device for spatially decomposing a light beam passing through the confocal stop into a wavelength spectrum, and an array of light-deflecting microelements arranged, at least, in a direction of spectral decomposition and receiving and deflecting a part of the light beam decomposed into the spectrum toward any of the plurality of photodetectors. Each of the light-deflecting microelements has a plurality of deflection angles at which the light beam is selectively received by any of the plurality of photodetectors so that one of the plurality of deflection angles can be selected at will.

19 Claims, 12 Drawing Sheets

SCANNING OPTICAL MICROSCOPE APPARATUS CAPABLE OF DETECTING A PLURALITY OF FLOURESCENT LIGHT BEAMS

BACKGROUND OF THE INVENTION

1. Field of the Invention

This invention relates to a scanning optical microscope apparatus which is capable of detecting a plurality of fluorescent light beams at the same time.

2. Description of Related Art

In general, fluorescence photodetectors are widely used in the fields of medicine, biology, and others, for the purpose of detecting protein and genes in which living tissues and cells are labeled by fluorescence. In particular, a multiple fluorescence detecting technique that a specimen stained by a plurality of fluorescent dyes is observed at a time has recently been employed to exercise its power for the analysis of a gene and the clarification of an intra-cellular structure.

As an effective means for such fluorescence detection, a laser scanning microscope (LSM) is well known. FIG. 1 shows schematically the arrangement of the LSM for fluorescence. In this LSM, laser beams emitted from three laser oscillators $1a$, $1b$, and $1c$ which oscillate three kinds of different wavelengths are combined on a common optical path by laser-beam combination dichroic mirrors $2a$ and $2b$. A combined laser beam is enlarged to a beam diameter of proper size through a beam expander 3, and is reflected by a dichroic mirror 4. After that, the laser beam deflected by an X-Y scanning optical system 5, such as galvanometer mirrors, and condensed through a pupil relay lens 6 and an objective lens 7 irradiates a specimen 8, which is scanned with a laser spot.

Fluorescent light from the specimen 8, excited by the irradiation of the laser beam, returns a course ranging from the objective lens 7 to the dichroic mirror 4, and after being transmitted through the dichroic mirror 4, is dispersed by a dichroic mirror $9a$ for dispersion. On the one hand, fluorescent light reflected by the dichroic mirror $9a$ is condensed by an imaging lens $10a$ and passes through a confocal stop $11a$. After wavelengths other than that of the first fluorescent light intended are absorbed or reflected by an absorption filter $12a$, its intensity is detected by a photodetector $13a$. The confocal stop $11a$ is placed at a position optically conjugate with the focal point of the objective lens 7 and blocks light other than the fluorescent light excited by the laser spot (The same holds for confocal stops $11b$ and $11c$). Consequently, an available image is very high in contrast. Moreover, a distance between the specimen 8 and the objective lens 7 is relatively changed along the optical axis, and thereby a three-dimensional image can be obtained.

On the other hand, fluorescent light transmitted through the dichroic mirror $9a$ is further dispersed by a dichroic mirror $9b$. Fluorescent light reflected by the dichroic mirror $9b$ is condensed by an imaging lens $10b$, and after passing through a confocal stop $11b$, is detected in intensity by a photodetector $13b$ through an absorption filter $12b$ transmitting only the second fluorescent light intended.

Fluorescent light transmitted through the dichroic mirror $9b$, after being reflected by a mirror, is condensed by an imaging lens $10c$, passes through a confocal stop $11c$, and is detected in intensity by a photodetector $13c$ through an absorption filter $12c$ transmitting only the third fluorescent light intended.

The LSM shown here is capable of detecting simultaneously triple excitation fluorescent light with three wavelengths emitted from the laser oscillators $1a$, $1b$, and $1c$. Whenever the conditions of multiple excitation, such as wavelengths of laser beams, the kind of fluorescent dye, and the number of laser oscillators, are changed, the dichroic mirror 4, the dichroic mirrors $9a$ and $9b$ for dispersion, and the absorption filters $12a$, $12b$, and $12c$ are replaced with those having the optimum dispersing characteristics.

However, a conventional LSM for fluorescence using optical filters has the following problems. First, an optical filer is such that its dispersing characteristic cannot be determined at will because of restrictions on fabrication, and thus the amount of fluorescent light and an S/N ratio are limited. In particular, the absorption filter needs to completely block excited light, but at present cannot be designed or fabricated so as not to loss the amount of light in the wavelength region of the highest fluorescence intensity, close to the wavelength of excited light. Second, expensive optical filters which are exclusively used in accordance with the wavelength of excited light and the fluorescent dye must be prepared, and when a variety of multiple excitation are assumed, it is unavoidable to cause an increase in the number of filters and the complication and oversizing of an apparatus. Third, as will be obvious from the LSM for fluorescence shown in FIG. 1, the multiple fluorescence is dispersed through a plurality of optical filters, and hence a considerable amount of light is lost before fluorescent light reaches each of the photodetectors. Any of these problems becomes severe as the multiplicity of excited light and fluorescent light increases.

In order to solve the above problems, several techniques of selecting and detecting a plurality of fluorescence wavelengths without using the optical filters are proposed. For example, WO 95/07447 discloses a spectroscope and a confocal fluorescence microscope in which a light beam decomposed into a wavelength spectrum by a prism is dispersed into a first wavelength region transmitted and a second wavelength region reflected by a slit-like mirror, and the position and width of a second slit restricting the slit-like mirror and the second wavelength region are controlled so that two arbitrary wavelength regions can be selected and detected.

On the other hand, Japanese Patent Preliminary Publication No. Hei 8-43739 discloses a scanning optical microscope in which a light beam passing through a confocal stop is dispersed by a grating so that a wavelength region and a wavelength width are selected by at least one slit, and the amount of light in the wavelength region is detected by a photodetector.

In the fluorescence detection for multiple excitation, each of these techniques is a means for providing a scanning optical microscope which surely blocks excitation wavelengths without using the optical filters and holds a sufficient amount of fluorescence to make the fluorescence detection with a high S/N ratio.

A spectrometer which is capable of selecting any wavelength without using the optical filters is disclosed, for example, in U.S. Pat. No. 5,504,575. This device is such that after a light beam to be detected is spatially decomposed into a wavelength spectrum by a dispersion element, at least one part of a dispersion spectrum is received by a spatial light modulator represented by a deformable mirror device, and only light in a desired spectral region is reflected or transmitted to detect its energy intensity. Once the relation between the dispersion element and the spatial light modulator or an energy detector is established, any mechanical movement, except for the spatial light modulator, is not required, and thus an error can be eliminated. Furthermore, a high-precision mechanical control becomes unnecessary.

The details of the deformable mirror device are set forth in U.S. Pat. No. 5,061,049. Specifically, this device includes a spatial array of micromirrors, each of which is capable of deflecting light at an arbitrary angle previously selected, only by the control of an applied voltage.

However, in WO 95/07447 mentioned above, slits determining a wavelength selection are attended with mechanical movements and their operating section requires an extremely high-grade control structure. Moreover, correction is required because the wear and vibration of a mechanical drive impair the reproducibility of measurement. In particular, when the light beam is dispersed, the slit-like mirror and the second slit must be mutually associated to move, and therefore it is very difficult to control this movement with a high degree of accuracy. In addition, if the kinds of fluorescence to be detected simultaneously are increased, one dispersion means is unsatisfactory, and a plurality of wavelength separating means must be used, thus causing a loss in the amount of light and the complication of the device.

In Hei 8-43739, as in the case of the scanning optical microscope in the foregoing, the accuracy of the mechanical drive and the reproducibility must be ensured. In addition to this problem, since a wavelength band which can be detected by a single photodetector is determined by a spectrum dispersing means such as a grating and the initial placement of the photodetector, the number of degrees of wavelength selection freedom in a broad wavelength band is too small to accommodate the varieties of the fluorescent dye and the laser beam wavelength in the fluorescence detection for multiple excitation.

The spectrometer disclosed in U.S. Pat. No. 5,504,575 is such that the detection of the amount of light in an arbitrary wavelength region is possible, and thus where one fluorescent light beam is obtained with respect to one excitation wavelength, this device can be applied to the LSM for fluorescence. However, where the intensities of fluorescent light multiplied by accommodating any combination of the excitation wavelength and the fluorescent dye are detected at the same time, the device cannot be easily incorporated in the LSM for fluorescence.

SUMMARY OF THE INVENTION

It is, therefore, an object of the present invention to provide a scanning optical microscope apparatus which has a simple structure in which optical filters are not used and a mechanical drive requiring a high degree of accuracy in positional reproducibility need not be provided, and is capable of detecting a fluorescent image for multiple excitation of a multiply stained specimen with a high S/N ratio, without changing its arrangement in various combinations of the excitation wavelength and the fluorescence dye.

In order to achieve the above object, the scanning optical microscope apparatus of the present invention includes a laser scanning optical microscope apparatus provided with a laser light source, an objective lens for condensing a laser beam emitted from the laser light source on a specimen, a scanning means for relatively scanning the specimen with a condensed laser spot, an imaging optical system for imaging light emanating from the specimen, a confocal stop placed at the focal point of the imaging optical system, and a plurality of photodetectors for detecting the light from the specimen, passing through the confocal stop. In this case, the scanning optical microscope apparatus includes a spectrum decomposing means for spatially decomposing a light beam passing through the confocal stop into a wavelength spectrum, and an array of light-deflecting microelements arranged, at least, in a direction of spectral decomposition and receiving and deflecting a part of the light beam decomposed into the spectrum toward any of the plurality of photodetectors. Each of the light-deflecting microelements has a plurality of deflection angles at which the light beam is selectively received by any of the plurality of photodetectors so that one of the plurality of deflection angles can be selected at will.

The scanning optical microscope apparatus satisfies the following condition:

$$d/\delta\lambda < 0.2$$

where d is the dimension of each of the light-deflecting microelements in the direction of spectral decomposition and $\delta\lambda$ is a distance between positions on the array of light-deflecting microelements on which two wavelengths of 656.27 nm and 486.13 nm, separated by the spectrum decomposing means, are incident.

Further, the scanning optical microscope apparatus is designed so that a laser beam for excitation is oscillated to thereby detect the position of each light-deflecting microelement corresponding to the wavelength of the laser beam, and the deflection angle of each light-deflecting microelement is determined in accordance with the information of this detection.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
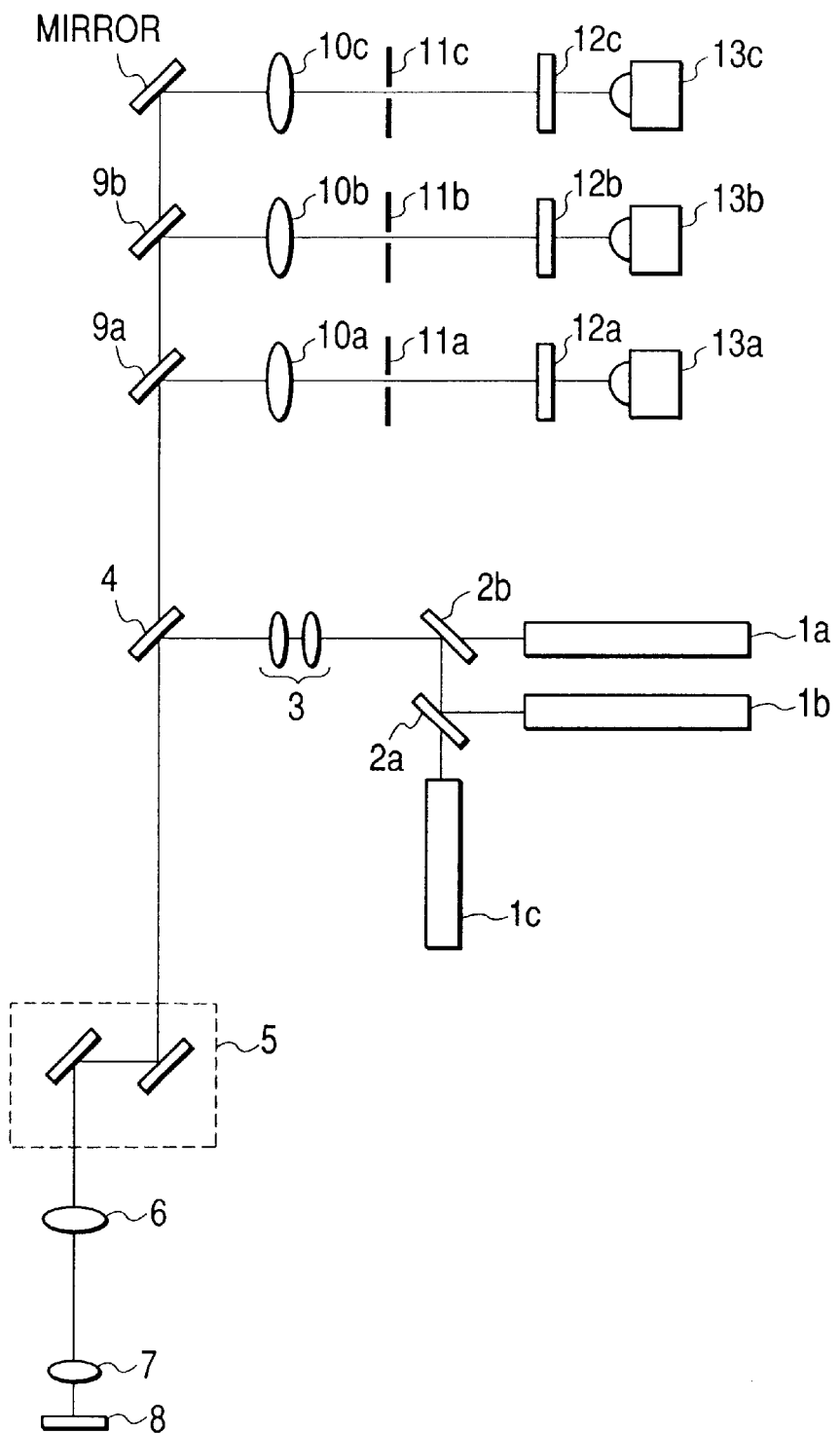
FIG. 1 is a view showing the arrangement of a conventional laser scanning microscope for fluorescence.

The scanning optical microscope apparatus of the present invention includes a laser scanning optical microscope apparatus provided with a laser light source, an objective lens for condensing a laser beam emitted from the laser light source on a specimen, a scanning means for relatively scanning the specimen with a condensed laser spot, an imaging optical system for imaging light emanating from the specimen, a confocal stop placed at the focal point of the imaging optical system, and a plurality of photodetectors for detecting the light from the specimen, passing through the confocal stop. In this case, the scanning optical microscope apparatus includes a spectrum decomposing means for spatially decomposing a light beam passing through the confocal stop into a wavelength spectrum, and an array of light-deflecting microelements arranged, at least, in a direction of spectral decomposition and receiving and deflecting a part of the light beam decomposed into the spectrum toward any of the plurality of photodetectors. Each of the light-deflecting microelements has a plurality of deflection angles at which the light beam is selectively received by any of the plurality of photodetectors so that one of the plurality of deflection angles can be selected at will.

In the apparatus of the present invention constructed as mentioned above, after the light beam passing through the confocal stop is spatially decomposed into the spectrum, a decomposed light beam is reflected so that it is received by any of the plurality of photodetectors in accordance with the width of microwavelength, and one photodetector receiving a light beam can be arbitrarily selected in accordance with the fluorescence wavelength region of a multiply stained specimen.

The light beam passing through the confocal stop contains a laser wavelength and a plurality of fluorescence wavelengths which are reflected by the specimen. When these wavelengths are spatially decomposed into the spectrum and are projected on the array of light-deflecting microelements arranged in the direction of the spectrum, wavelength information is transferred into the positional information of the light-deflecting microelements. Here, light-deflecting microelements corresponding to the positions of incidence of the plurality of fluorescence wavelengths deflect fluorescent light at angles such that it is received by different photodetectors. At the same time, light-deflecting microelements corresponding to excitation wavelengths deflect light in entirely different directions such that it does not reach the photodetectors which detect the fluorescent light.

In the apparatus of the present invention, the above function allows the excitation wavelengths which degrade the contrast of an image to be completely eliminated, and multiple fluorescence is separated so that separated light can be detected simultaneously.

Further, the apparatus of the present invention is provided with a structure such that each of the light-deflecting microelements has a plurality of deflection angles at which the light beam decomposed into the spectrum is received by any of a plurality of photodetectors. One photodetector receiving a light beam is arbitrarily selected in accordance with observation conditions of the laser wavelength and the multiple stained fluorescence, and thereby all kinds of multiple excitation fluorescence equivalent to the number of photodetectors can be dispersed for detection. In this case, any mechanical drive is not necessary with the exception that the deflection angles of the light-deflecting microelements are changed stepwise, and the modification of the apparatus and the replacement of parts are also not necessary. Since the deflection angle of each light-deflecting -microelement can be controlled by an electrical digital signal, the apparatus itself requires neither a high degree of accuracy nor a complicated structure.

Still further, the apparatus of the present invention is designed to place a collimating lens for converting a light beam passing through the confocal stop into a nearly parallel beam between the confocal stop and the spectrum decomposing means, a condensing optical system for condensing spectral light of each light beam decomposed into a spectrum, at least, in the direction of its spectral decomposition, and the array of light-deflecting microelements close to the condensing position of the light.

The divergence of the light beam passing through the confocal stop causes a large error in the case of the spectral decomposition with an angle as the function of a wavelength. For this reason, it is required that the light beam incident on the spectrum decomposing means is made nearly parallel by the collimating lens. This nearly parallel light beam is decomposed into a spectrum, with an angle as the function of a wavelength, through the spectrum decomposing means such as a prism or grating. However, the parallel beam has a finite thickness, and thus unless a distance between the array of light-deflecting microelements and the spectrum decomposing means is sufficient, required wavelengths will be superimposed with different wavelengths on the array, and wavelength resolution will be deteriorated.

In the present invention, the condensing optical system for condensing the light beam decomposed into the spectrum on the array of light-deflecting microelements is provided, and thereby a position on the array can be made to correspond to a wavelength of the function of a ray angle in a proportion of 1 to 1. Moreover, since the distance between the array and the spectrum decomposing means can be reduced, compactness of the apparatus can be achieved.

In the scanning optical microscope apparatus of the present invention, it is good practice to interpose at least one optical system with a positive refracting power between the array of light-deflecting microelements and the plurality of photodetectors. The diameter of each divergent beam caused after reflection by the array is reduced by the optical system with a positive refracting power, and thereby a fluorescence intensity to be detected is transmitted to the photodetector without any loss, so that the amount of light with a high S/N ratio can be detected.

Of the light-deflecting microelements constituting the array, two adjacent light-deflecting microelements have at least one common deflection angle at which the light beam is received by the photodetector.

Where the excitation wavelength and the fluorescence wavelength are separated, the S/N ratio of a fluorescent image is materially affected by the determination of a boundary wavelength between them. In order to optimize one element unit as to which of the light-deflecting microelements should receive light to be transmitted as fluorescent light to the photodetector, or which of the light-deflecting microelements should receive light to be eliminated as excited light, the two adjacent light-deflecting microelements must have at least one -common reflection angle at which the light beam is received by the photodetector. Based on this construction, the selection of the boundary wavelength is controlled with one element unit of the light-deflecting microelements, and fluorescence can be detected with the highest S/N ratio-suitable for an observation condition which changes with a laser beam intensity, the diameter of the confocal stop, an observation magnification, the fluorescent dye, and staining.

It is desirable that the scanning optical microscope apparatus of the present invention satisfies the following condition:

$$d/\delta\lambda < 0.2 \tag{1}$$

where d is the dimension of each of the light-deflecting microelements in the direction of spectral decomposition and $\delta\lambda$ is a distance between positions on the array of light-deflecting microelements on which two wavelengths of 656.27 nm and 486.13 nm, separated by the spectrum decomposing means, are incident.

The light beams decomposed into the spectrum on the array of light-deflecting microelements are dispersed, with one light-deflecting microelement as a minimum unit. Thus, the wavelength resolution of a microscope body is restricted by the relative relation between the amount of wavelength separation on the array, namely the distance $\delta\lambda$ between positions on the array of light-deflecting microelements on which two wavelengths of 656.27 nm and 486.13 nm, separated by the spectrum decomposing means, are incident and the dimension d of each of the light-deflecting microelements in the direction of spectral decomposition. If the value of $d/\delta\lambda$ exceeds 0.2, the wavelength resolution of the microscope will be insufficient, and it becomes difficult to detect an image with a favorable S/N ratio for the reason that many fluorescence intensities, together with the excitation wavelengths, are separated unnecessarily or fluorescent light containing the excited light in no small quantities is detected.

It is desirable that the scanning optical microscope apparatus of the present invention further satisfies the following condition:

$$(\lambda m \cdot f_2)/(NA_1 \cdot \delta\lambda \cdot f_1) < 0.35 \tag{2}$$

where $\lambda m$ is the maximum wavelength of light to be detected, $f_1$ is the focal length of the collimating lens, $f_2$ is the focal length of the condensing optical system, and $NA_1$ is the numerical aperture of the light beam passing through the confocal stop and entering the collimating lens.

Figure 2:
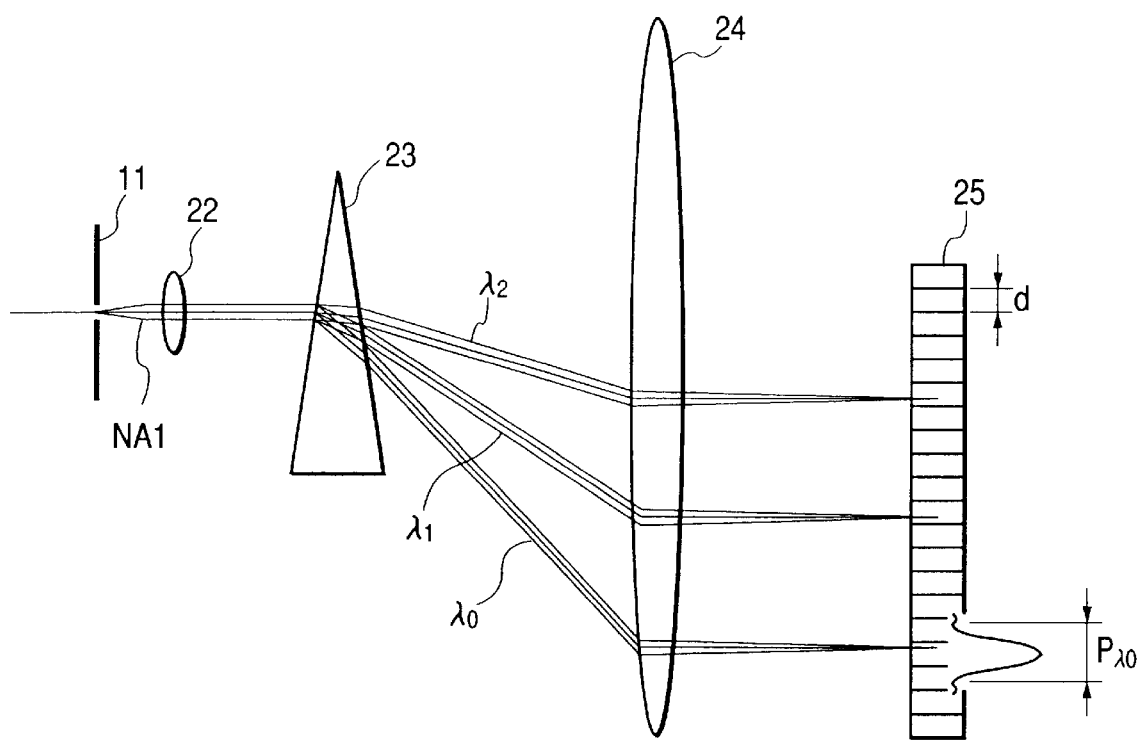
FIG. 2 is a view for explaining the arrangement of an optical system in the scanning optical microscope apparatus of the present invention.

Here, the arrangement of an optical system in the scanning optical microscope apparatus of the present invention will be explained with reference to FIG. 2. A light beam passing through a confocal stop 11 is rendered nearly parallel by a collimating lens 22 and is condensed, through a prism 23 which is the spectrum composing means and a condensing lens 24, on a mirror array 25 which is one aspect of the array of light-deflecting microelements, in accordance with each spectrum. In the figure, reference symbols $\lambda_0$, $\lambda_1$, and $\lambda_2$ denote three arbitrary wavelengths in the light beam.

The divergence of the light beam passing through the confocal stop 11 is defined as the numerical aperture $NA_1$ which is the sine function of its divergence angle. The numerical aperture $NA_1$ is characterized by an optical system ranging from a specimen, not shown, to the confocal stop 11. A spot diameter $P(\lambda_0)$ of a certain wavelength $\lambda_0$ on the mirror array 25 is expressed by the following equation as the function of $(NA_1 \cdot f_1/f_2$ which is the numerical aperture of the light beam condensed on the mirror array 25 and the wavelength $\lambda_0$:

$$P(\lambda_0) = (1.22 \cdot f_2 \cdot \lambda_0)/(NA_1 \cdot f_1) \tag{3}$$

The ratio between the spot diameter $P(\lambda_0)$ and the amount of wavelength separation $\delta\lambda$ may be thought of as a parameter which expresses the wavelength resolution of an optical system ranging from the confocal stop 11 to the mirror array 25. If the value of $(\lambda m \cdot f_2)/(NA_1 \cdot \delta\lambda \cdot f_1)$ in condition (2) exceeds 0.35, a continuous spectrum on the mirror array 25 will be blurred by the optical system and the wavelength resolution necessary and sufficient for separating fluorescent light from excited light cannot be obtained, thus making it difficult to detect fluorescent light with a favorable S/N ratio.

Furthermore, it is desirable that the scanning optical microscope apparatus of the present invention satisfies the following condition:

$$(NA_1 \cdot f_1)/(f_2 \cdot \sin\theta m) < 1 \tag{4}$$

where $\theta m$ is the minimum deflection angle of the light-deflecting microelement.

For different wavelengths to be separated, individual beams are deflected in different directions by the array of light-deflecting microelements and thereby the wavelength separation is achieved. However, if the divergence angle of a deflected beam is extremely large, two kinds of fluorescent light, or excited light and fluorescent light will cease to be completely separated because of the production of cross talk. The left side of Condition (4) is expressed by the ratio between $(NA_1 \cdot f_1)/f_2$ characterizing the divergence angle of the light beam deflected by the array of light-deflecting microelements and the sine function of the minimum deflection angle $\theta m$ of the light-deflecting microelement, and indicates the degree of cross talk in the wavelength separation. If the value of the left side, $(NA_1 \cdot f_1)/(f_2 \cdot \sin\theta m)$, of Condition (4) exceeds 1, it becomes difficult to detect fluorescent light with a favorable S/N ratio because of the cross talk.

The scanning optical microscope apparatus of the present invention further includes a memory section for storing the angle of each light-deflecting microelement, an input section for inputting information corresponding to the laser beam wavelength and the fluorescent dye, and a control section for reproducing a state of light deflection of each light-deflecting microelement stored from this input information.

In the multiple fluorescence detection, combinations of the laser oscillator with the fluorescent dye used exist innumerably. The fact that whenever the condition of such a combination is changed, the deflection angle of each light-deflecting microelement must be set inflicts considerable torture upon a worker. According to the apparatus of the present invention, since the laser and the fluorescent dye which are multiply used and a state of a microscope accommodating the fluorescence detection once made can be reproduced in any time by a simple input to the input section, intricate work in measurement is lessened and a comfortable operation is ensured. Moreover, measurement errors are eliminated and the damage and bleaching of the specimen caused by the irradiation of a strong laser beam can be minimized.

In the scanning optical microscope apparatus of the present invention, the oscillation of the laser beam for excitation allows the detection of the position of each light-deflecting microelement corresponding to the wavelength of the laser beam, and the deflection angle of each light-deflecting microelement is determined in accordance with this detection information.

In the apparatus of the present invention, the laser beam for excitation is passed through the confocal stop with some means such that the laser beam is reflected by a mirror located at the position of the specimen, and is introduced through the spectrum decomposing means to the array of light-deflecting microelements. In this case, the laser beam is reflected by each of the light-deflecting microelements constituting the array toward one of the photodetectors, and the amount of light is detected by each photodetector. Thus, the position of the light-deflecting microelement corresponding to the wavelength of the laser beam for excitation can be detected. When the deflection angle of each light-deflecting microelement is determined in accordance with this detection information, the calibration of the microscope body is made with respect to a change with aging of the laser beam wavelength and a change in environment, and thereby the multiple fluorescence can be always detected with the highest N/S ratio. A fully automatic system can be constructed in association with a laser oscillation mechanism.

In the scanning optical microscope apparatus of the present invention, it is desirable that each of the light-deflecting microelements includes a micromirror element.

The scanning optical microscope apparatus of the present invention is constructed so that the fluorescent light is detected and at the same time, the intensity of light with an excitation wavelength is detected by at least one of the plurality of photodetectors.

For a means for specifying the position of a part to which the fluorescent dye is applied, as well as for observing a state of a change with thereof, and at the same time, for obtaining the contour of a cell, it is thought of as effective in various fields that analyses are made from some points of view by combining a fluorescence observation with another microscopy, for example, a differential interference technique. In the LSM, it is common practice to detect the transmitted image of the specimen as an observation technique used simultaneously with the fluorescence observation. With the detection of the transmitted image, however, it is very difficult to detect a confocal point because of a structural problem.

Thus, in the present invention, a light beam corresponding to the excitation wavelength, of the spectrum dispersed on the array of light-deflecting microelements, is deflected toward at least one photodetector and the intensity of light with the excitation wavelength is detected to obtain an image. At the same time, fluorescence is detected by another photodetector, and thereby both a fluorescent image and an image formed by the excited light reflected and scattered by the specimen can be obtained simultaneously as three-dimensional information. Because of the advantage of the present invention that the fluorescent light and the excited light are completely separated in wavelength, for example, even where an interference image in which it is difficult to yield a contrast is detected, an image with a very good S/N ratio can be obtained without the influence of the fluorescence.

In the present invention, as mentioned above, fluorescence information of staining of the specimen and information on the phase of the specimen, for example, the contour thereof, can be analyzed simultaneously and three-dimensionally.

In the scanning optical microscope apparatus of the present invention, the laser beam with which the specimen is irradiated is linearly polarized, and a polarizing plate is interposed between the array of light-deflecting microelements and one of the photodetectors for detecting the intensity of light with the excitation wavelength.

As examples of techniques of detecting the confocal point of reflected light, are cited a polarization observation capable of detecting the birefringent property of a specimen and a so-called reflection contrast technique that detects an interference image formed between a glass cover and a specimen. In the polarization observation, an incident laser beam is rendered incident as a linearly polarized light on the specimen, and a polarizing plate is placed which is oriented so that reflected light from the specimen is perpendicular to the orientation of polarization of the incident laser beam. On the other hand, for the reflection contrast technique, in order to prevent an incident laser beam reflected by a lens surface from becoming flare, the incident laser beam is rendered incident as a linearly polarized light on the specimen, and a quarter-wave plate is interposed between the specimen and a lens causing flare so that only flare caused by the lens is eliminated by a polarizing plate oriented normal to the orientation of polarization of the incident laser beam. In either case, the polarizing plate is required between the specimen and the detector. However, in view of simultaneous detection of the fluorescent light and the excited light, an arrangement such that the fluorescent light is transmitted through the polarizing plate causes a great loss of the amount of light and fails to form a bright image. Thus, in the present invention, the polarizing plate is interposed between the array of light-deflecting microelements and the photodetector for detecting the intensity of light with the excitation wavelength, and thereby only the excitation wavelength passes through the polarizing plate and the amount of fluorescent light ceases to be lost at all. In this way, simultaneous detection of reflected light with bright fluorescent light and excited light becomes possible.

In the scanning optical microscope apparatus of the present invention, a Nomarski prism is interposed between the objective lens and the imaging optical system. Owing to this arrangement, the amount of fluorescent light is not lost, and a simultaneous observation of the differential interference image and the fluorescent image can be made.

The scanning optical microscope apparatus of the present invention is such that -the polarizing plate is placed to be movable in and out of the optical path which the excitation wavelength follows.

As mentioned above, the polarizing plate interposed between the array of light-deflecting microelements and the photodetector for detecting the intensity of light with the excitation wavelength is indispensable for observations on polarization and differential interference and the elimination of flare, but where the multiple fluorescence observation is made, it is also assumed that fluorescent light is detected by the photodetector. In this case, if the polarizing plate is placed in the optical path, the amount of fluorescent light will be considerably lost. In the present invention, because the polarizing plate is placed to be movable in and out of the optical path which the excitation wavelength follows, the -amount of light is not lost and a bright image is obtained even though the fluorescent light is detected by the photodetector.

The scanning optical microscope apparatus of the present invention is designed so that, in accordance with the intensity of light with the excitation wavelength, detected by at least one of the plurality of photodetectors, a background noise caused by the excited light is removed from the intensity of fluorescent light detected by another photodetector.

The light beam incident on the array of light-deflecting microelements is sometimes scattered in directions other than a desired direction by a gap between the microelements, or the surface damage or edge of the microelement In particular, excited light reflected and scattered by the specimen is stronger in intensity than the fluorescent light; and thus when such scattered light is mixed with the fluorescent light, the background noise is caused and the contrast of an image is remarkably deteriorated.

To obviate this problem, it is necessary to eliminate a background image caused by the excited light from the fluorescent image, but it is optically difficult to completely eliminate the background noise from the information of the intensity of light in which the excitation wavelength responsible for the background noise is mixed with the fluorescence wavelength.

Thus, in the present invention, only the excitation wavelength, of the light beams incident on the array of light-deflecting microelements, is deflected toward at least one photodetector to detect the intensity of only excited light which does not contain the fluorescent light. From this information, it is possible to justly estimate the background noise caused by the excited light, and by a proper calculation of the intensity of the fluorescent light derived from another photodetector, an image with a high S/N ratio can be obtained. The detection of the background noise and the detection of the fluorescent light are performed simultaneously for processing and thereby an image which has the property of withstanding a fluctuation with time of a noise component and is clear can be provided.

Furthermore, the present invention has the advantage that any unit, with the exception of an arithmetical processing unit, need not be added, and the oversizing and complexity of the apparatus can be avoided.

The scanning optical microscope apparatus is also designed so that the ratio between the intensity of light with an excitation wavelength detected by at least one of the plurality of photodetectors and the intensity of light with an excitation wavelength received by each of the other photodetectors for detecting the fluorescent light is previously derived, and in accordance with this ratio, the noise of the excited light is eliminated from the intensity of the fluorescent light.

The intensity of the excited light detected as the background noise varies with the relative positions of the laser spot and the specimen. Usually, in this case, the specimen is previously irradiated with the excited light to measure the background noise, but with a specimen stained with fluorescence, fluorescent light is produced and it is very difficult to detect the amount of the excited light alone. Even though the image of the excited light alone is previously obtained, there is a strong possibility that a slight shift between the positions of a fluorescent image and an excitation image in image processing causes the deterioration of an image which is not negligible. To correct this, additional processing is required.

Thus, in the present invention, special attention is devoted to the fact that the ratio between the intensity of the excited light emanating from the specimen, reaching the array of light-deflecting microelements, and scattered light responsible for the background noise is kept to be nearly constant, and it is realized to estimate the background noise with an easy calculation process and with a high degree of accuracy to eliminate it. This technique is very effective when the background noise is dependent on the position of the specimen because the background noise is estimated in accordance with a desired ratio relative to the detected intensity of the excited light. Moreover, if this ratio is corrected, taking account of the characteristics of the input and output of the photodetector and the scattering angle of the specimen, the noise can be eliminated with a higher degree of accuracy.

The scanning optical microscope apparatus of the present invention is constructed so that the background noise caused by the excited light mixed with a fluorescence signal is removed in accordance with the following equation:

$$I_{img} = I_{FL} - (\alpha \cdot I_{EX} + \beta \cdot I_{IN}) \tag{5}$$

where $I_{img}$ is the intensity of the fluorescent light after the background noise caused by the excited light is eliminated, $I_{FL}$ is a detected intensity of the fluorescent light, $I_{EX}$ is the intensity of light with the excitation wavelength detected by at least one of the plurality of photodetectors, $I_{IN}$ is the intensity of the laser beam incident on the specimen, and $\alpha$ and $\lambda$ are parameters which are dependent on a state of the scanning optical microscope apparatus. The intensities $I_{img}$, $I_{FL}$, $I_{EX}$, and $I_{IN}$ are also functions which are dependent on the relative positions of the specimen and the laser spot.

In order to estimate more accurately the intensity of the excited light scattered by the array of light-deflecting microelements and detected as the background noise, it is necessary to make a distinction as to whether the excited light incident on the array of light-deflecting microelements comes from the specimen or from the apparatus. This is because it is conceivable that, in both cases, the numerical apertures and intensity distributions of the light beams incident on the array do not necessarily coincide, respectively, and thus the degrees of scattering of the light on the array are different. For the noise of the excited light attributable to the apparatus itself, its intensity $I_{sys}$ is proportional to the intensity of the laser beam incident on the specimen and therefore can be assumed as $$I_{sys} = \beta' \cdot I_{LN} \tag{6}$$

where $\beta'$ is a constant.

On the other hand, for the noise caused by the excited light coming from the specimen, its intensity $I_{sample}$ can be expressed as $$I_{sample} = \alpha' \cdot (I_{EX} - \beta'' \cdot I_{sys}) \tag{7}$$

where $\alpha$ and $\beta$ are constants.

The sum of the intensities $I_{sys}$ and $I_{sample}$ is the background noise attributable to the excited light scattered by the array of light-deflecting microelements. Arrangement of the constants then yields $$(\alpha \cdot I_{EX} + \beta \cdot I_{IN}) \tag{8}$$

Hence, by Equation (5) in which the above value is subtracted from the intensity of the fluorescent light, the intensity of fluorescent light after the background noise caused by the excited light is eliminated can be calculated. Actually, the above constants $\alpha$ and $\beta$ are uniquely obtained from measured values in two proper states such as a change of the intensity of the incident laser beam and the presence or absence of the specimen.

Thus, in the present invention, the source of the excitation wavelength passing through the confocal stop is separated into the specimen and the apparatus, which are taken into account, and thereby the background noise is estimated with a high degree of accuracy and is eliminated from the fluorescence signal, so that a fluorescent image with an excellent S/N ratio is obtained. In each of the above conditions, when correction is made, taking account of the characteristics of the input and output of the photodetector and the scattering angle of the specimen, the noise can be eliminated with a higher degree of accuracy.

In the scanning optical microscope apparatus of the present invention, the optimum values of the parameters $\alpha$ and β are previously obtained in accordance with the states of the scanning optical microscope apparatus and the specimen.

The optimization of each of the parameters α and β needs a value varying with the laser beam wavelength and an optical system used. In actual work, the objective lens and the laser beam wavelength are often changed, and thus a considerable load is imposed upon a worker in order to optimize the parameters. In the present invention, the parameters α and β are previously obtained with respect to a state of the apparatus multiply used or a state of the apparatus in which measurement is once made, so that the parameters can be always fetched. Consequently, a worker's load is lessened and a comfortable operation can be ensured. Moreover, measurement errors are eliminated and the damage and bleaching of the specimen caused by the irradiation of a strong laser beam can be minimized.

In accordance with the embodiments shown in the drawings, the present invention will be described in detail below. Also, like numerals indicate like members with members used in the prior art example shown in FIG. 1.

First Embodiment

Figure 3:
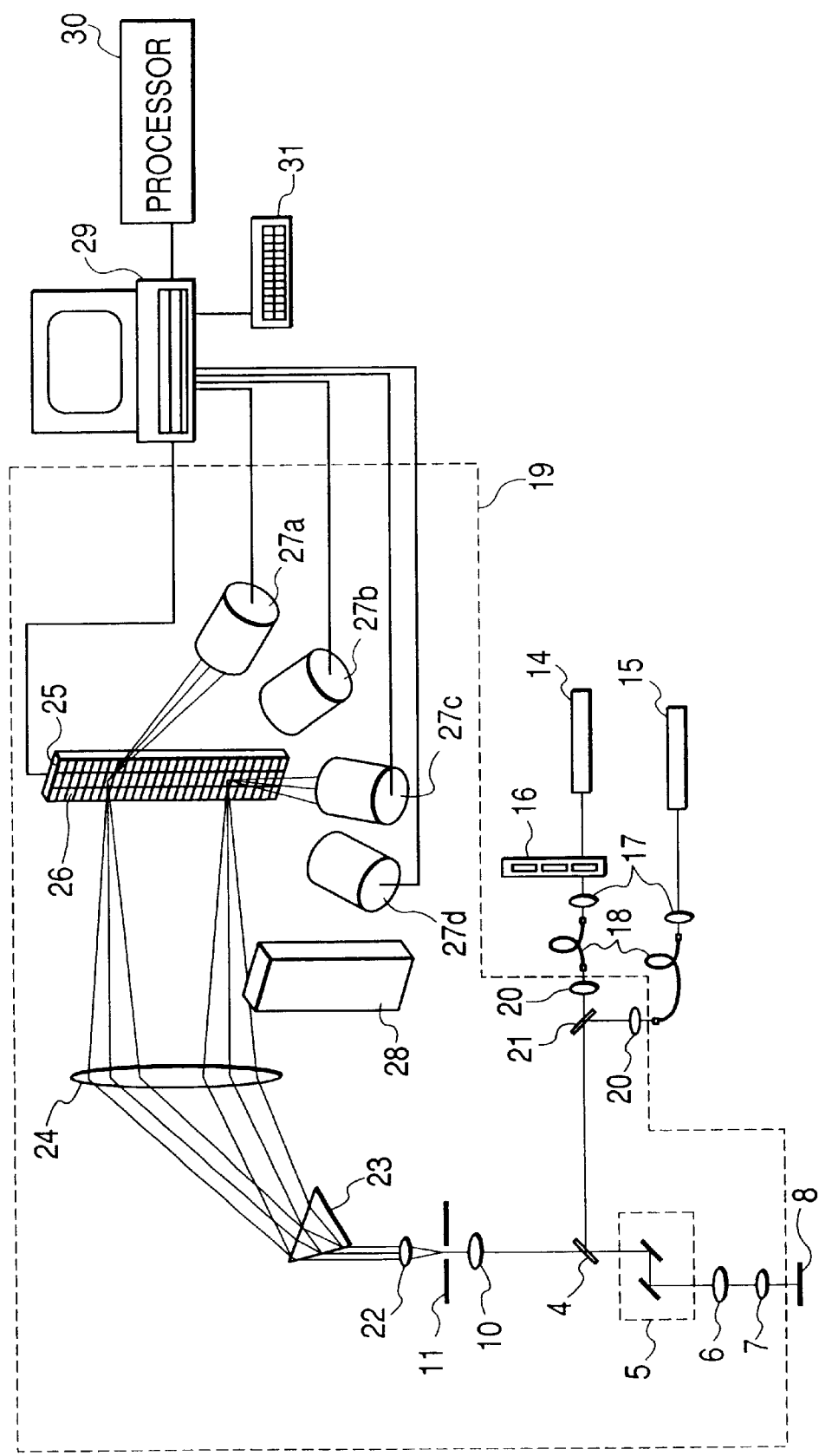
FIG. 3 is a view showing the arrangement of the scanning optical microscope apparatus of a first embodiment in the present invention.

FIG. 3 shows the arrangement of the scanning optical microscope apparatus in this embodiment. The apparatus of the first embodiment includes, as light sources, a multiline Kr—Ar laser 14 which simultaneously oscillates laser beams with wavelengths of 488 nm, 568 nm, and 647 nm and an Ar laser 15 which oscillates a laser beam with a wavelength of 351 nm. The laser beams emitted from the lasers, after passing through fiber coupling lenses 17, travel through single mode fibers 18 and are introduced into a scanning optical microscope body 19. The laser beams emitted from the multiline Kr—Ar laser 14 are such that excitation wavelengths can be selected by a laser line filter 16. The laser beams introduced into the scanning optical microscope body 19 are converted into parallel beams with proper diameters by beam collimating lenses 20. A dichroic mirror 21 mixes the laser beams from the multiline Kr—Ar laser 14 with the laser beam from the Ar laser 15. A mixed laser beam is reflected by the dichroic mirror 4 for excitation and is deflected by the X-Y scanning optical system 5, such as galvanometer mirrors, so that the specimen 8 is scanned with a laser spot through the pupil relay lens 6 and the objective lens 7.

Fluorescent light from the specimen 8, excited by the irradiation of the laser beam, returns a course ranging from the objective lens 7 to the dichroic mirror 4, and after being transmitted through the dichroic mirror 4 and condensed by an imaging lens 10, passes through the confocal stop 11. Also, although the laser beam is mostly reflected by the dichroic mirror 4, its slight remainder passes through the dichroic mirror 4, together with the fluorescent light. The laser beam passing through the dichroic mirror 4 travels through the confocal stop 11 and is converted into a parallel beam by the collimating lens 22. The laser beam is deflected at an angle peculiar to an individual laser beam wavelength by the prism 23, emerges therefrom, and is imaged through the condensing lens 24 on the mirror array 25. In this case, the angle of emergence of the individual laser beam wavelength from the prism 23 is transferred into positional information on the mirror array 25 so that the position of each of micromirror elements 26 constituting the mirror array 25 corresponds to the individual laser beam wavelength.

In the apparatus of the first embodiment, instead of the prism 23, a spectrum decomposing element, such as a grating, an acoustic optical element, or a holographic element, may be employed. The condensing lens 24 can be replaced with an optical system which has a refracting power in the direction of spectrum decomposition.

Each of the micromirror elements 26 has five selectable reflection angles, such as deflection angles at which light beams incident thereon are reflected toward photodetectors 27a, 27b, 27c, and 27d and toward an optical trap 28. The selection of each of these angles can be made through an input section 31 by an electrical signal from a controller 29, with one element unit. When some input corresponding to the laser or the fluorescent dye is executed at the input section 31, the controller 29 fetches the information of the angle of each micromirror element 26 stored in a memory section 30 so that an optimum measuring condition can be always reproduced. Only the predetermined angle of each micromirror element 26 can also be stored in the memory section 30.

The dispersion of multiple fluorescence is achieved in such a way that the micromirror elements 26 corresponding to laser beam wavelengths reflect incident light toward the optical trap 28 and the micromirror elements 26 corresponding to fluorescence wavelengths reflect fluorescent light toward the different photodetectors 27a–27d in accordance with the type of fluorescent light. The intensities of light are thus detected by the photodetectors 27a–27d.

In the apparatus of the first embodiment, as mentioned above, the dispersion of multiple fluorescence is performed by only simultaneous reflection, irrespective of the number of multiple-fluorescent dyes, and hence a loss of the amount of light is minimized.

Figure 4A:
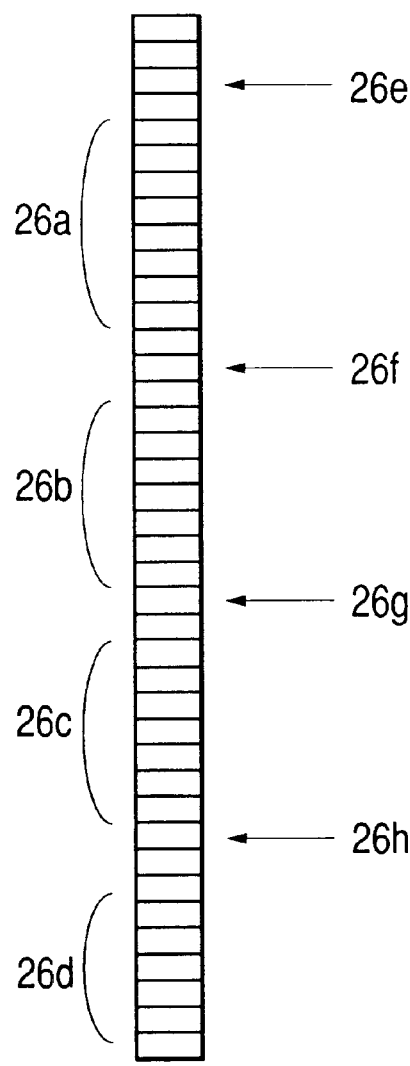
FIGS. 4A and 4B are views showing arrays of micromirror elements in FIG. 2.

Here, consider the case where the excitation wavelength and the fluorescent dye are changed. For quadruple-excitation wavelengths of 351 nm, 488 nm, 568 nm, and 647 nm, when the specimen is stained with four fluorescent dyes excited by these wavelengths, a state of the mirror array 25, as shown in FIG. 4A, is such that micromirror elements 26e, 26f, 26g, and 26h corresponding to the excitation wavelengths deflect light condensed at their positions toward the optical trap 28. On the other hand, fluorescent light excited by wavelengths of 351 nm, 488 nm, 568 nm, and 647 nm is reflected by micromirror elements 26a, 26b, 26c, and 26d corresponding to individual wavelengths toward the photodetectors 27a, 27b, 27c, and 27d, respectively. In this way, the intensities of light are detected.

Figure 4B:
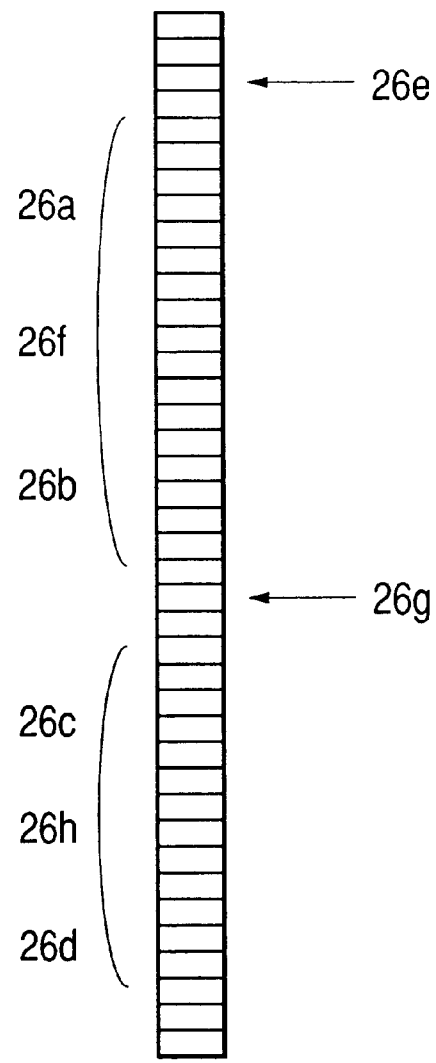

Subsequently, for double-excitation wavelengths of 351 nm and 568 nm, when the specimen is stained with two fluorescent dyes excited by these wavelengths, as shown in FIG. 4B, the micromirror elements 26e and 26g corresponding to the excitation wavelengths deflect light condensed at their positions toward the optical trap 28. Fluorescent light excited by the wavelength of 351 nm is reflected, toward the photodetector 27a, by the micromirror elements 26a, 26f, and 26b corresponding to this wavelength. On the other hand, fluorescent light excited by the wavelength of 568 nm is reflected, toward the photodetector 27c, by the micromirror elements 26c, 26h, and 26d corresponding to this wavelength. Consequently, in the photodetectors 27a and 27c, the intensities of light are detected.

Similarly, even where the laser sources themselves are changed, the deflection angles of the micromirror elements 26 are properly selected and thereby the intensities of light can be detected.

Thus, that the optimum fluorescence dispersion is always performed with respect to various combinations of the excitation wavelength and the fluorescent dye is entirely due to the fact that each of the micromirror elements 26 has a plurality of reflection angles at which light beams are selectively received by a plurality of photodetectors, and one of the plurality of reflection angles can be selected at will.

In this way, the apparatus of the first embodiment has a simple structure in which optical filters are not used and a mechanical drive requiring a high degree of accuracy of positional reproducibility need not be provided, and is capable of detecting a fluorescent image for multiple excitation of a multiply stained specimen with a high S/N ratio, without changing its arrangement even with various combinations of the excitation wavelength and the fluorescence dye.

The following are numerical values relative to the optical specification and the conditions of the scanning optical microscope apparatus of the first embodiment.

The divergence of the light beam passing through the confocal stop 11 fluctuates between the numerical apertures $NA_1$ of 0.0044 and 0.011 by the replacement of the objective lens 7.

Maximum wavelength of light to be detected, $\lambda_m = 700$ nm $\delta\lambda = 1.879$ mm Focal length of the collimating lens 22, $f_1 = 170$ mm Focal length of the condensing lens 24, $f_2 = 74$ mm $d = 11$ μm $\theta_m = 5°$ $d/(\delta\lambda) = 11/1879 = 0.0059$ When the numerical aperture $NA_1$ is smallest:

$$(\lambda_m \cdot f_2)/(NA_1 \cdot \delta\lambda \cdot f_1) = 0.7 \cdot 74000/(0.0044 \cdot 1879 \cdot 170000) = 0.037$$

When the numerical aperture $NA_1$ is largest:

$$(NA_1 \cdot f_1)/(f_2 \cdot \sin\theta_m) = 0.011 \cdot 170000/(74000 \cdot 0.087) = 0.29$$

Second Embodiment

Figure 5:
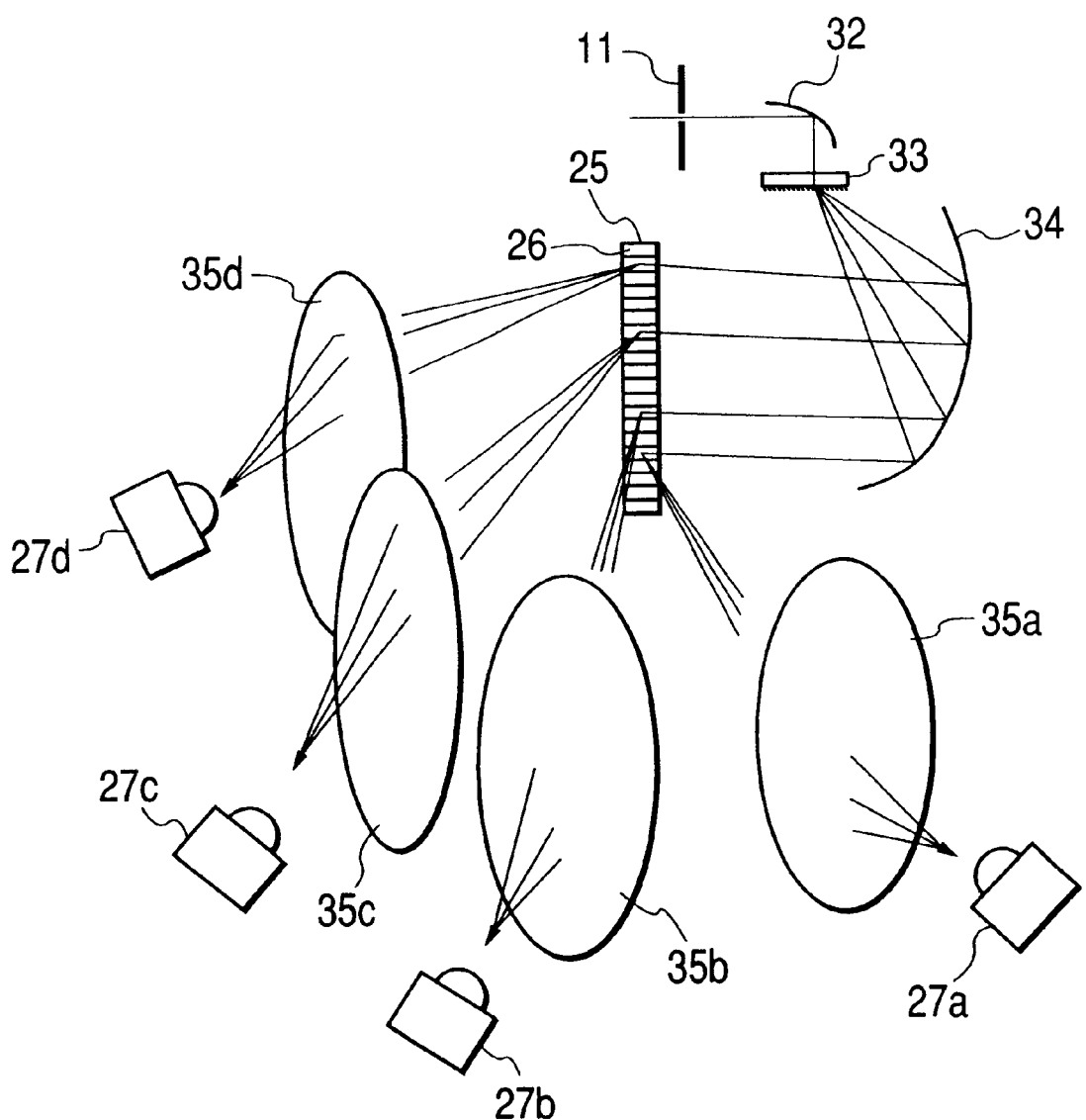
FIG. 5 is a view showing the arrangement of the scanning optical microscope apparatus of a second embodiment in the present invention.

FIG. 5 shows the arrangement of the scanning optical microscope apparatus in this embodiment. In this figure, an optical arrangement ranging from the laser light sources to the confocal stop is omitted because it is the same as in the first embodiment.

In the apparatus of the second embodiment, as shown in FIG. 5, a divergent beam passing through the confocal stop 11 is changed into a parallel beam by a collimating mirror 32. Subsequently, while wavelength information is transferred into the positional information of the micromirror elements 26 by a grating 33 and a condensing mirror 34, each of light beams is condensed on the mirror array 25. For the collimating mirror 32 and the condensing mirror 34, there is no need to consider the production of chromatic aberration and thus a compact arrangement is possible. Here, although the dispersion of multiple fluorescence is performed like the first embodiment, condensing lenses 35a, 35b, 35c, and 35d are interposed between the mirror array 25 and the photodetectors 27a–27d, and thereby divergent beams reflected by the mirror array 25 can be introduced into the photodetectors 27a–27d without any loss of the amount of light.

Figure 6:
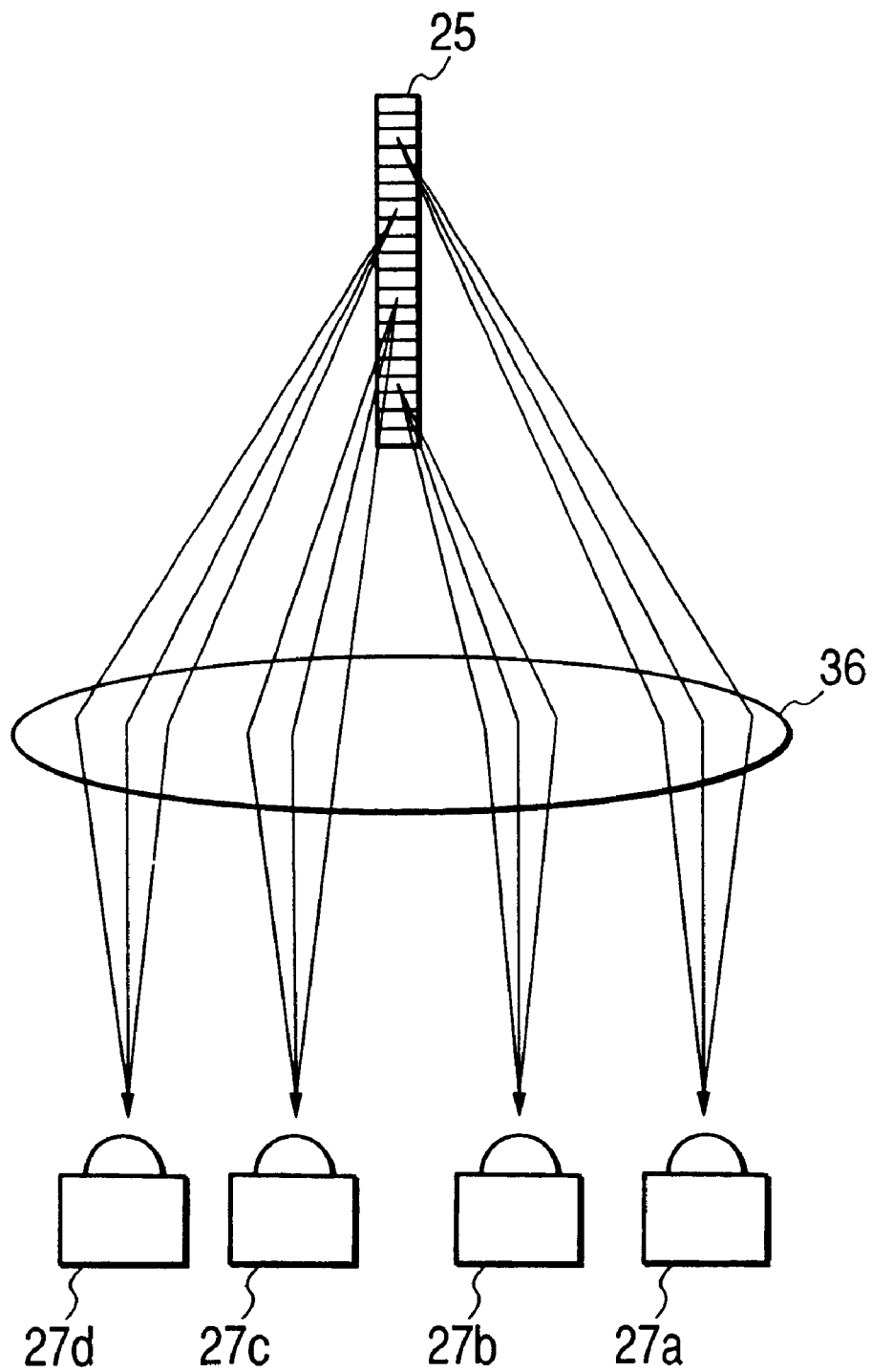
FIG. 6 is a view showing a modified arrangement of the scanning optical microscope apparatus of the second embodiment in FIG. 5.

FIG. 6 shows a modified arrangement of the condensing lenses 35a–35d. As shown in this figure, even when a condensing lens 36 for condensing light beams dispersed toward the photodetectors 27a–27d is placed instead of the condensing lenses 35a–35d, the same effect is brought about. The condensing lenses 35a–35d and 36 can also be replaced by various condensing elements such as reflection type condensing elements.

The following are numerical values relative to the optical specification and the conditions of the scanning optical microscope apparatus of the second embodiment.

The divergence of the light beam passing through the confocal stop 11 fluctuates between the numerical apertures $NA_1$ of 0.002 and 0.011 by the replacement of the objective lens 7.

Maximum wavelength of light to be detected, $\lambda_m = 1200$ nm $\delta\lambda = 1.63$ mm Focal length of the collimating mirror 32, $f_1 = 45$ mm Focal length of the condensing mirror 34, $f_2 = 35$ mm $d = 100$ μm $\theta_m = 3°$ $d/\delta\lambda = 100/1630 = 0.061$ When the numerical aperture $NA_1$ is smallest:

$$(\lambda_m \cdot f_2)/(NA_1 \cdot \delta\lambda \cdot f_1) = 1.2 \cdot 35000/(0.002 \cdot 1630 \cdot 45000) = 0.29$$

When the numerical aperture $NA_1$ is largest:

$$(NA_1 \cdot f_1)/(f_2 \cdot \sin\theta_m) = 0.011 \cdot 45000/(35000 \cdot 0.087) = 0.27$$

Third Embodiment

Figure 7:
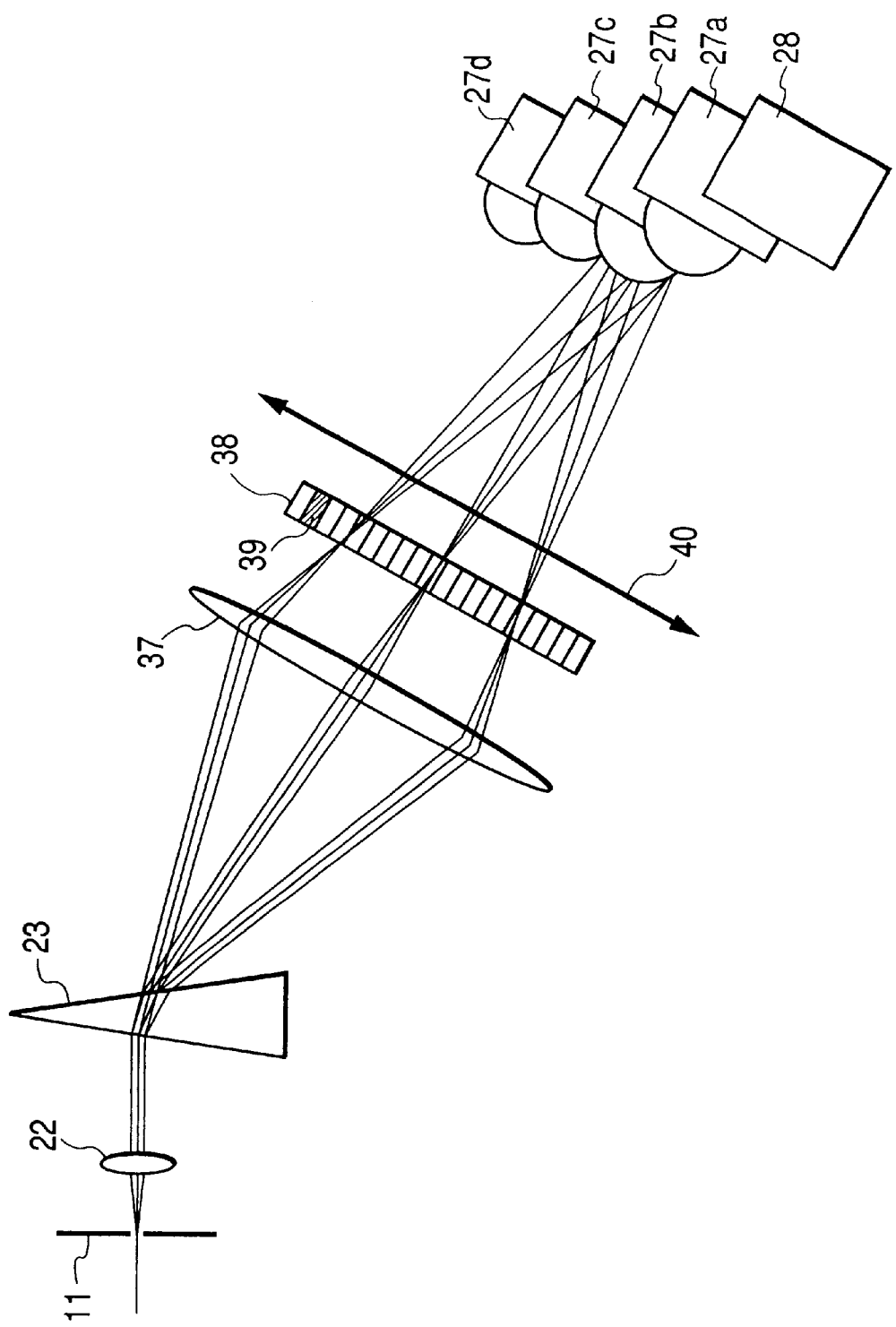
FIG. 7 is a view showing the arrangement of the scanning optical microscope apparatus of a third embodiment in the present invention.

FIG. 7 shows the arrangement of the scanning optical microscope apparatus in this embodiment. In this figure, an optical arrangement ranging from the laser light sources to the confocal stop is omitted because it is the same as in the first embodiment.

In the apparatus of the third embodiment, as shown in FIG. 7, a divergent beam passing through the confocal stop 11 is changed into a parallel beam by the collimating lens 22. Subsequently, wavelength information is transferred into the positional information of transmission type light-deflecting microelements 39 by the prism 23 and a condensing lens 37, and each of light beams is condensed on a transmission type light-deflecting microelement array 38. The transmission type light-deflecting microelements 39 are designed so that the wedge angle of each of transparent, variable-shape light refracting elements, like silicon, is changed to arbitrarily alter the direction of refraction of light transmitted through the array with one element unit. The direction of light deflection by each of the transmission type light-deflecting microelements 39 lies in a plane nearly perpendicular to an axis 40 where the array 38 receives a continuous spectrum. The photodetectors 27a–27d are also arranged in the plane nearly perpendicular to the axis 40. Each of the transmission type light-deflecting microelements 39 has five selectable deflection angles such that light beams incident thereon are refracted toward the photodetectors 27a–27d and toward the optical trap 28, and the selection of these angles is made with one element unit.

The dispersion of multiple fluorescence is achieved in such a way that the transmission type light-deflecting microelements 39 corresponding to laser beam wavelengths deflect incident light toward the optical trap 28, and the transmission type light-deflecting microelements 39 corresponding to fluorescence wavelengths deflect fluorescent light toward the individual photodetectors 27a–27d in accordance with the type of fluorescent light. The intensities of light are thus detected by the photodetectors 27a–27d.

In the apparatus of the third embodiment, as mentioned above, the dispersion of multiple fluorescence is performed by only simultaneous reflection, irrespective of the number of multiple-fluorescent dyes, and hence a loss of the amount of light can be minimized.

Moreover, in the apparatus of the third embodiment, each of the photodetectors 27a–27d is particularly located at a position conjugate with the position of the prism 23 situated before the light beam is separated, through the condensing lens 37 and the transmission type light-deflecting microelement array 38. Consequently, each of the light beams deflected by the array 38 is always directed toward the center of one of the photodetectors 27a–27d, irrespective of the positions of the microelements 39. Although, in FIG. 7, a state where light beams are received by the photodetector 27b is shown, the other photodetectors 27a, 27c, and 27d are also arranged on the same plane nearly perpendicular to the axis 40 as the photodetector 27b, and thus any of the light beams transmitted through the microelements 39 reaches nearly to the center of each photodetector.

Thus, according to the apparatus of the third embodiment, even when the effective light-receiving surface of each photodetector is small, the optimum dispersion of fluorescence accommodating various laser beam wavelengths and fluorescent dyes is performed without any loss of the amount of light, and an image with a high S/N ratio can be obtained.

The following are numerical values relative to the optical specification and the conditions of the scanning optical microscope apparatus of the third embodiment.

The divergence of the light beam passing through the confocal stop 11 fluctuates between the numerical apertures $NA_1$ of 0.0044 and 0.011 by the replacement of the objective lens 7.

Figure 8:
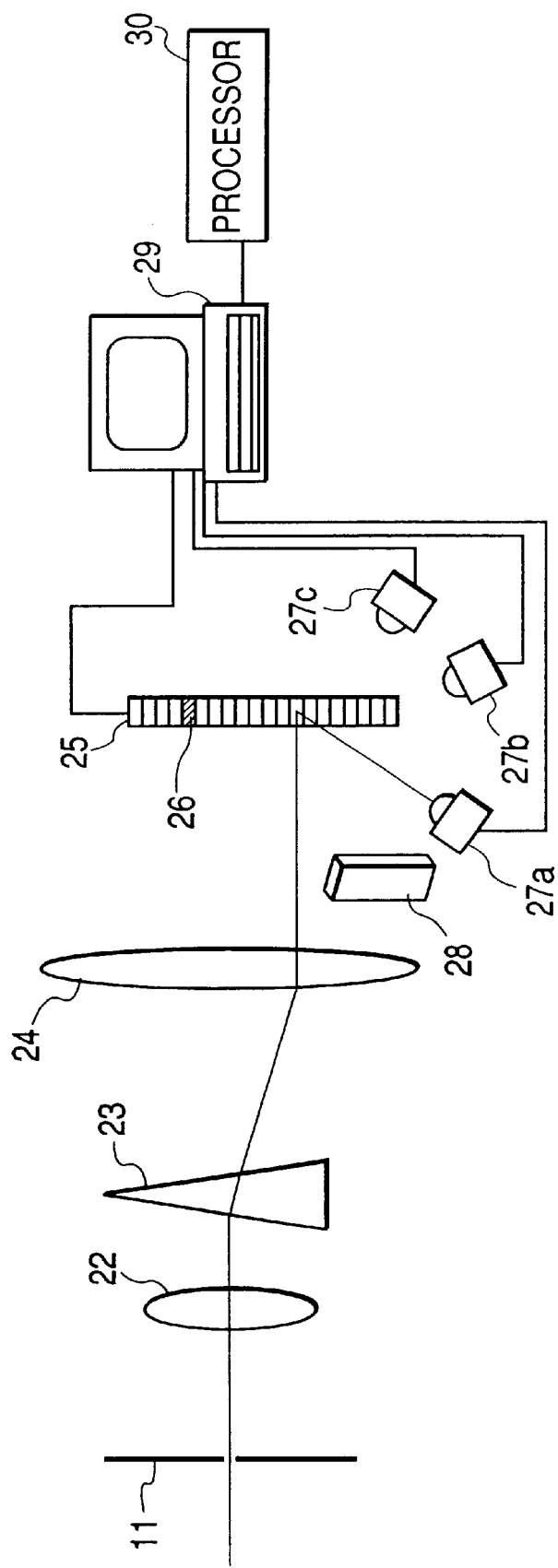
FIG. 8 is a view showing the arrangement of the scanning optical microscope apparatus of a fourth embodiment in the present invention.

Maximum wavelength of light to be detected, $\lambda_m=1000$ nm $\delta\lambda=3.21$ mm Focal length of the collimating lens 22, $f_1=150$ mm Focal length of the condensing lens 37, $f_2=100$ mm $d=50$ $\mu$m $\theta_m=5°$ $d/\delta\lambda=50/3210=0.015$ When the numerical aperture $NA_1$ is smallest:

$(\lambda_m \cdot f_2)/(NA_1 \cdot \delta\lambda \cdot f_1)=1 \cdot 100000/(0.0044 \cdot 3210 \cdot 150000)=0.047$ When the numerical aperture $NA_1$ is largest:

$(NA_1 \cdot f_1)/(f_2 \sin \theta_m)=0.011 \cdot 170000/(100000 \cdot 0.087)=0.21$ Fourth Embodiment FIG. 8 shows the arrangement of the scanning optical microscope apparatus in this embodiment. In this figure, an optical arrangement ranging from the laser light sources to the confocal stop is omitted because it is the same as in the first embodiment. Also, omitted members are explained using the reference numerals shown in FIG. 3.

Figure 9:
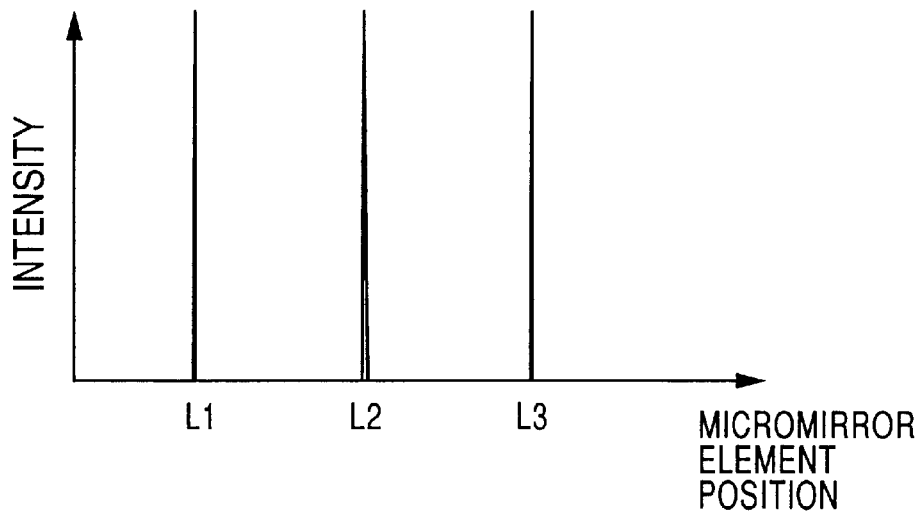
FIG. 9 is a graph showing the relation between the position of each micromirror element and the light intensity in the scanning optical microscope apparatus of the fourth embodiment.

In the apparatus of the fourth embodiment, before a fluorescence-stained specimen is measured, laser beams are oscillated from the multiline Kr—Ar laser 14, and a laser beam reaching the specimen 8 is reflected by the surface of a glass cover and is passed through the confocal stop 11 through an optical system ranging from the objective lens 7 to the imaging lens 10. In this case, the laser beam need not necessarily be reflected at the position of the specimen 8, and it is only necessary to pass the light beam through the confocal stop 11 by some means. Subsequently, as shown in FIG. 8, the laser beam is condensed through the collimating lens 22, the prism 23, and the condensing lens 24 on the mirror array 25. Here, the light beam reaching each micromirror element 26 is reflected toward the photodetector 27a in order from the end, and the relationship between the position of the micromirror element 26 and the intensity of light reaching this position is established. The graph of FIG. 9 shows an example of this. The position of the micromirror element 26 is plotted along the abscissa and the intensity of light along the ordinate. Reference symbols $L_1$, $L_2$, and $L_3$ denote the positions of the micromirror elements 26 corresponding to laser beam wavelengths. Based on this result, the controller 29 determines automatically the angles of the micromirror elements 26.

Figure 10:
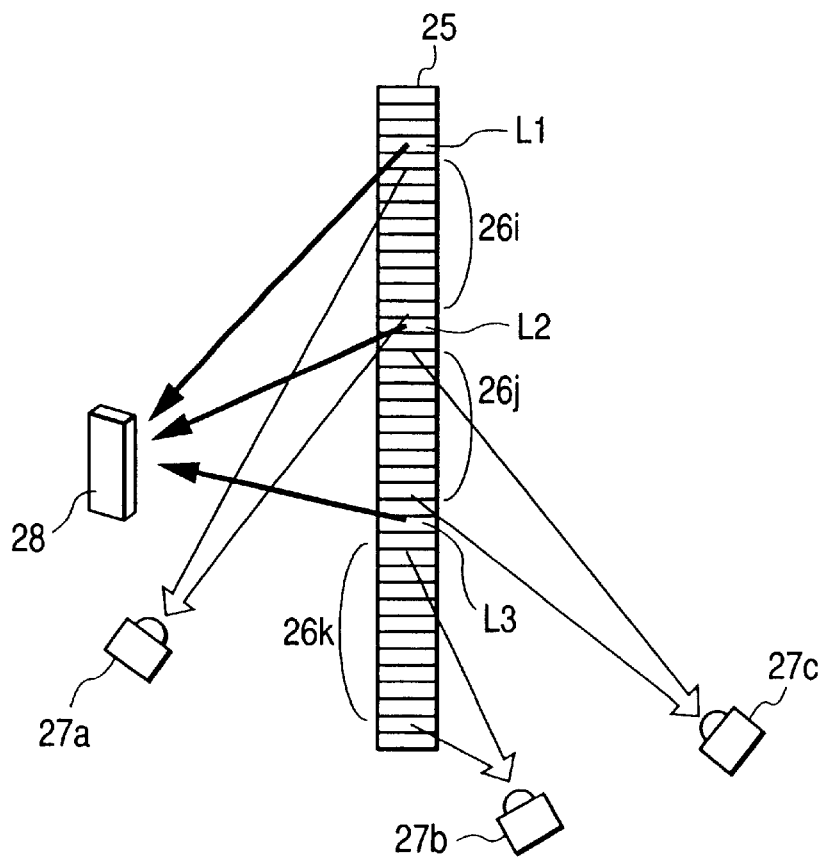
FIG. 10 is a view showing a state where light is dispersed by a mirror array of FIG. 8.

FIG. 10 shows a state where light is dispersed by the mirror array 25 of FIG. 8 in accordance with the result given by the graph of FIG. 9. The micromirror elements 26 corresponding to the positions $L_1$, $L_2$, and $L_3$ reflect the light beams reaching these positions toward the laser trap 28. The reflection angles of micromirror elements 26i, 26j, and 26k are set so that they reflect fluorescent light toward the photodetectors 27a, 27c, and 27b, respectively. Such a series of operation is performed automatically by only simple instructions to the controller 29.

Hence, in the apparatus of the fourth embodiment, errors of the apparatus caused by a change with time of the laser beam wavelength and a change in environment can be easily corrected, and the detection of multiple fluorescence is always possible with the highest S/N ratio. Furthermore, if a laser oscillation mechanism is associated with a series of operation described above, an automated system having the above effect can be constructed even where any laser is used.

The following are numerical values relative to the optical specification and the conditions of the scanning optical microscope apparatus of the fourth embodiment.

The divergence of the light beam passing through the confocal stop 11 fluctuates between the numerical apertures $NA_1$ of 0.0044 and 0.011 by the replacement of the objective lens 7.

Figure 11:
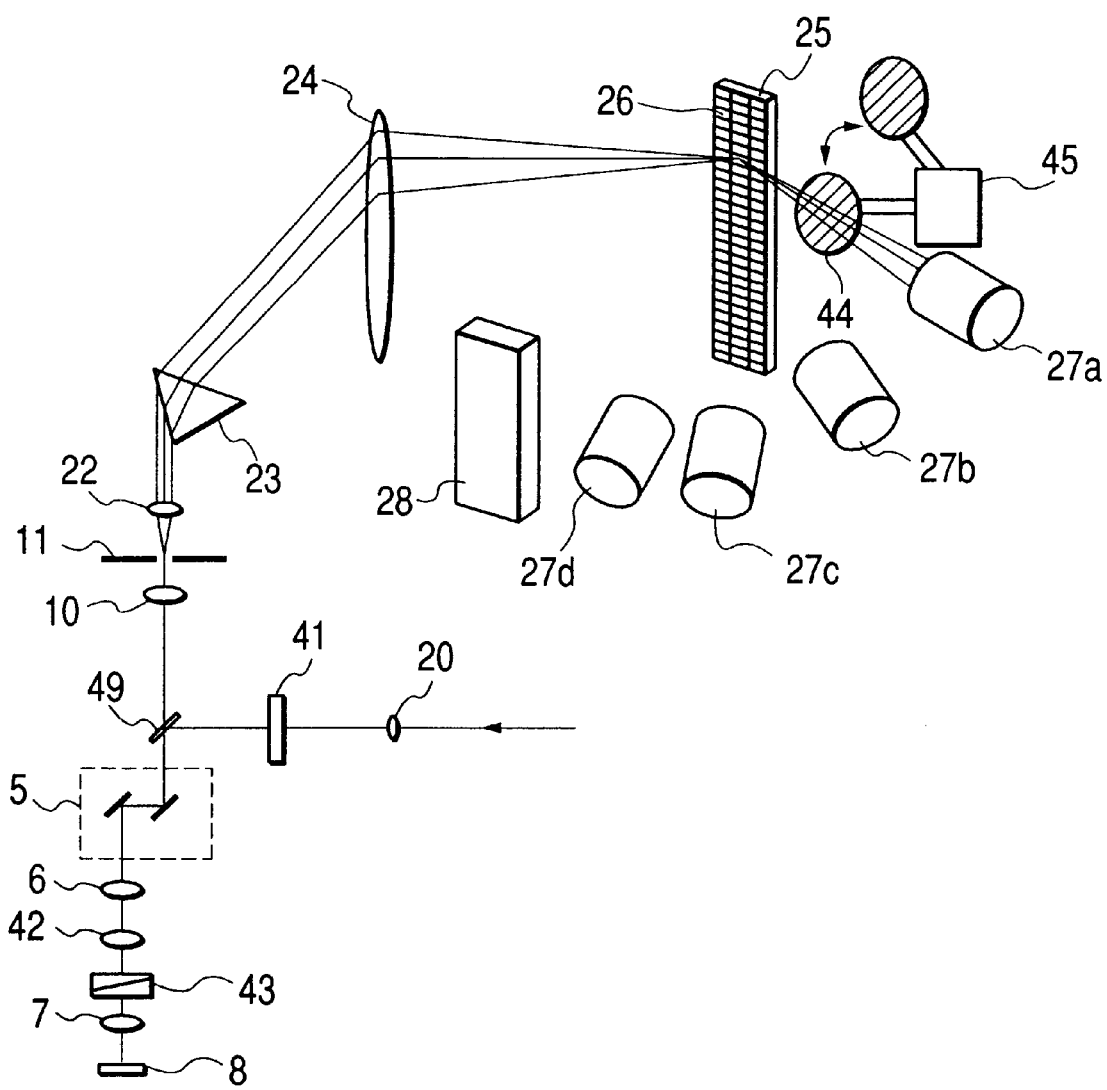
FIG. 11 is a view showing the arrangement of the scanning optical microscope apparatus of a fifth embodiment in the present invention.

Maximum wavelength of light to be detected, $\lambda_m=1000$ nm $\delta\lambda=0.42$ mm Focal length of the collimating lens 22, $f_1=170$ mm Focal length of the condensing lens 24, $f_2=25$ mm $d=50$ $\mu$m $\theta_m=5°$ $d/\delta\lambda=50/420=0.119$ When the numerical aperture $NA_1$ is smallest:

$(\lambda_m \cdot f_2)/(NA_1 \cdot \delta\lambda \cdot f_1)=1 \cdot 25000/(0.0044 \cdot 420 \cdot 170000)=0.08$ When the numerical aperture $NA_1$ is largest:

$(NA_1 \cdot f_1)/(f_2 \sin \theta_m)=0.011 \cdot 170000/(25000 \cdot 0.087)=0.86$ Fifth Embodiment FIG. 11 shows the arrangement of the scanning optical microscope apparatus in this embodiment. In this figure, an optical arrangement ranging from the laser light sources to the collimating lens 20 is omitted because it is the same as in the first embodiment.

In the apparatus of the fifth embodiment, as shown in FIG. 11, a laser beam converted into a parallel beam having a proper beam diameter by the collimating lens 20 is such that only a linearly polarized component is transmitted by a polarizing plate 41. The laser beam which has become linearly polarized light is reflected by a path-splitting mirror 49, and after being deflected by the X-Y scanning optical system 5 such as galvanometer mirrors, is incident through the pupil relay lens 6 and an imaging lens 42 on a Nomarski prism 43. The laser beam incident on the Nomarski prism 43, after being separated into two components, an ordinary ray and an extraordinary ray, passes through the objective lens 7 and, as a laser spot, scans the specimen. The laser spot reflected by the specimen 8 is again incident through the objective lens 7 on the Nomarski prism 43. In this case, two separated components (laser beams) are combined and returns a course to the path-splitting mirror 49 as light having a differential signal (differential information) which is dependent on the optical path difference of each beam. On the other hand, fluorescent light from the specimen 8 excited by the irradiation of the laser beams also returns the course ranging from the objective lens 7 to the path-splitting mirror 49. The laser beams reflected by the specimen 8 are transmitted through the path-splitting mirror 49, together with the fluorescent light emanating from the specimen 8, and are condensed by the imaging lens 10 to pass through the confocal stop 11. The light beam passing through the confocal stop 11 and collimated by the collimating lens 22 is condensed through the prism 23 and condensing lens 24 on the mirror array 25 in accordance with its wavelength. In this case, the wavelength information of the light beam is transferred into the positional information of each of the micromirror elements 26 constituting the mirror array 25.

Here, only a laser beam wavelength to be detected as a differential interference image is reflected toward the photodetector 27a, and the micromirror elements 26 corresponding to the other wavelengths reflect incident beams toward the laser trap 28. The laser beam reflected toward the photodetector 27a is changed into a differential interference signal by passing through a polarizing plate 44 placed in a direction perpendicular to the direction of polarization of the laser beam. In this way, the amount of light thereof is detected by the photodetector 27a and the differential interference image is obtained. Simultaneously, the micromirror elements 26 corresponding to fluorescence wavelengths reflect fluorescent light toward the photodetectors 27b, 27c, and 27d in accordance with the fluorescence wavelengths to detect the intensities of light. Both the differential interference image and the fluorescent image are obtained by passing through the confocal stop 11 and thus have resolution in the direction of the optical axis.

In the apparatus of the fifth embodiment, as mentioned above, the multiple fluorescent image and the differential interference image can be obtained simultaneously and as confocal images, and can be detected as images with little noise and with high S/N ratios because individual signals are completely separated with respect to the wavelength. Also, the polarizing plate is not placed on a path which the fluorescent light follows, and hence a fairly bright, fluorescent image is obtained.

Here, consider the case where the differential interference image is detected by one detector by using the same apparatus and at the same time, fluorescent images with three wavelengths are individually detected by the other three detectors, followed by the detection of fluorescent images with four wavelengths by four detectors. Of the light beams condensed on the mirror array 25, all the laser beams are deflected toward the laser trap 28, while four fluorescent beams are reflected toward the photodetectors 27a, 27b, 27c, and 27d, respectively. In this case, the polarizing plate 44 interposed between the mirror array 25 and the photodetector 27a is removed from the optical path for fluorescent light by a drive section 45, and even when the differential interference detection is not made, the amount of fluorescent light is not lost.

Figure 12:
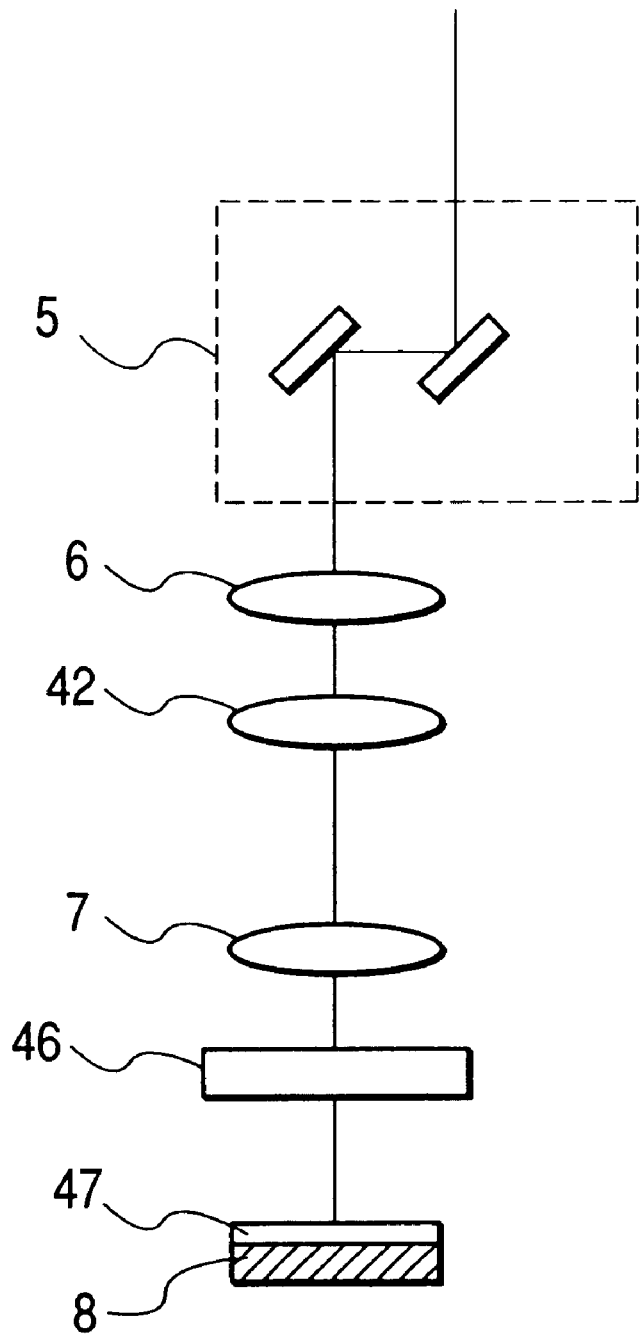
FIG. 12 is a view showing a modified arrangement of the scanning optical microscope apparatus of the fifth embodiment in FIG. 11.

A modification example of the fifth embodiment is shown in FIG. 12. In this figure, an optical arrangement ranging from the laser light sources to the X-Y scanning optical system 5 and an optical arrangement ranging from the X-Y scanning optical system 5 to the photodetectors 27a–27d are omitted because they are the same as in the first embodiment.

A laser beam deflected by the X-Y scanning optical system 5 is incident through the pupil relay lens 6, the imaging lens 42, and the objective lens 7 on a quarter-wave plate 46, and after being converted from linearly polarized light into circularly polarized light, scans the specimen 8, as a laser spot. Here, the laser beam interferes between the specimen 8 and a glass cover 47 enclosing the specimen 8, and the phase information of the specimen 8 is detected as an interference signal. The light beam reflected by the specimen 8, after passing again through the quarter-wave plate 47, follows the same course as in the fifth embodiment. Consequently, the amount of light thereof is detected as a so-called reflection contrast signal by the photodetector 27a. In this case, the polarizing plate 44 is interposed between the mirror array 25 and the photodetector 27a so that it is oriented in a direction normal to the direction of polarization of the incident laser beam. Hence, the light beam reflected by the specimen 8 is detected as it is, while flare light reflected by the lens surface is blocked by the polarizing plate 44. Fluorescent light excited by the laser beam incident on the specimen 8, as in the fifth embodiment, is separated by the mirror array 25, and the intensities of separated light are detected by the photodetectors 27b, 27c, and 27d. That is, the multiple fluorescent image is obtained together with the reflection contrast image after flare is eliminated. It is needless to say that both the reflection image and the fluorescent image are obtained as the confocal images even in the fifth embodiment.

In the fifth embodiment, as described above, even when the apparatus has an arrangement for flare elimination which is indispensable for detection of reflected light, the intensity of fluorescent light is not entirely lost, and the reflected light and the fluorescent light can be observed simultaneously.

Sixth Embodiment

Figure 13:
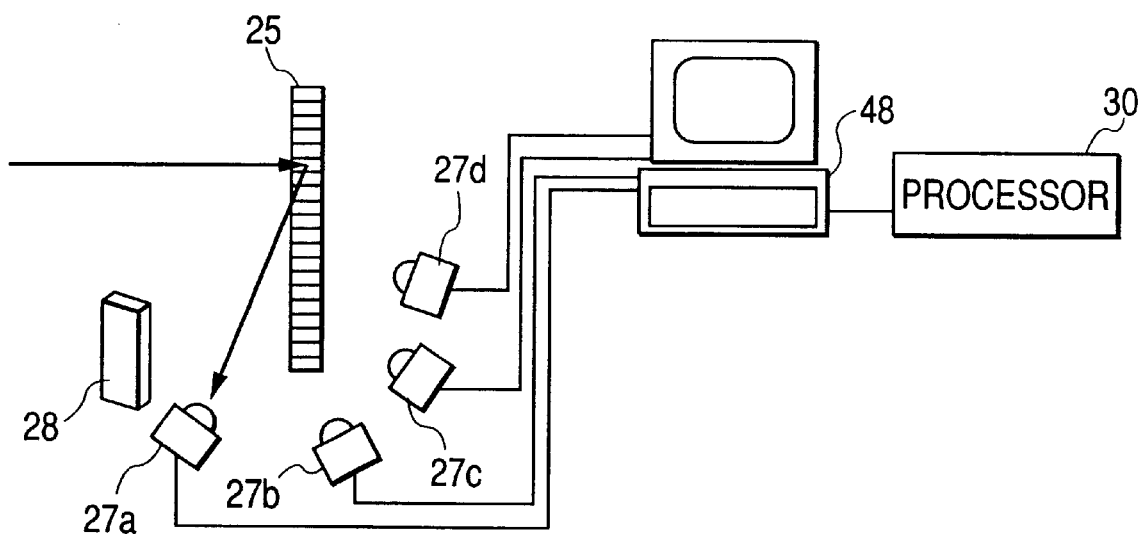
FIG. 13 is a view showing the arrangement of the scanning optical microscope apparatus according to sixth and seventh embodiments in the present invention.

FIG. 13 shows the arrangement of the scanning optical microscope apparatus in this embodiment. In this figure, an optical arrangement ranging from the laser light sources to the mirror array 25 is omitted because it is-the same as in the first embodiment. Also, omitted members are explained using the reference numerals shown in FIG. 3.

In the apparatus of the sixth embodiment, before a fluorescence-stained specimen is measured, laser beams are oscillated from the multiline Kr—Ar laser 14 to irradiate a proper part of the specimen 8, and reflected light therefrom is condensed on the mirror array 25 through an optical system ranging from the objective lens 7 to the condensing lens 24. Here, the angles of the micromirror elements 26 are set so that one of the micromirror elements 26 deflects the laser beam reflected by the specimen 8 toward the photodetector 27a and light with wavelengths corresponding to the other micromirror elements is deflected toward the laser trap 28. The intensity of the laser beam reflected by the specimen 8 is detected by the photodetector 27a, while the intensities of scattered light produced by a laser beam incident on a gap between the microelements, or the surface damage or edge of the microelement are detected by the photodetectors 27b–27d. The intensities derived from the photodetectors 27b–27d are stored in the memory section 30, together with measuring conditions relative to the objective lens, the size of the confocal stop, and the laser wavelength, in such a way that after the input and output characteristics of each photodetector are corrected through an arithmetical processing unit 48, the ratio between the intensity of the laser beam derived from the photodetector 27a and the intensity of scattered light incident on each of the photodetectors 27b–27d is calculated. Here, corresponding ratios are represented by αa, αb, and αc.

After necessary data are obtained as described above, the noise is eliminated as follows: Of the light beams separated in wavelength on the mirror array 25, the laser beam is directed toward the photodetector 27a and the fluorescent light is toward any of the photodetectors 27b–27d so that the intensities of light are detected. Here, consider the case where the intensity of fluorescent light is detected by the photodetector 27b in order to explain the sixth embodiment. The values of the intensities of light detected by the photodetectors 27a and 27b are corrected according to the input and output characteristics of individual photodetectors. When the intensities after correction are denoted by Ia and Ib, respectively, a noise elimination from the fluorescent image is achieved by performing the following arithmetical processing through the arithmetical processing unit 48:

$$Ib - \alpha b \cdot Ia \quad (9)$$

This processing can be performed in succession at real time while scanning the specimen. Moreover, since the amount of data is smaller than in the calculations of images and thus an expensive arithmetical processing unit is not required.

Furthermore, in the sixth embodiment, the data αb necessary for the noise elimination are derived in accordance with changes in the conditions of the apparatus relative to the laser wavelength, the objective lens, and the size of the confocal stop and are stored in the memory section 30. A program is incorporated in the arithmetical processing unit 48 so that a proper value is fetched in association with the condition of the apparatus to make a calculation for noise elimination automatically. In addition, the data αb where some standard specimens, for example, a reflection specimen, a weak-scattering specimen, and a strong-scattering specimen, are measured are previously obtained and stored in the memory section 30, so that a proper selection can be made in accordance with a specimen to be observed.

Thus, the apparatus of the sixth embodiment has the feature of withstanding a fluctuation with time of a noise component because the noise detection and the fluorescence detection are made simultaneously. Further, this embodiment uses the technique of accurately estimating the background noise, not a frequency filtering, to eliminate it from the fluorescent image, thereby correctly reproducing the original fluorescent image. Still further, the amount of data required for the calculation is very small and high-speed processing can be realized. The automatization of the arithmetical processing for noise elimination described above reduces a worker's load.

As a modification example of the sixth embodiment, the multiple fluorescence can also be detected by the use of a plurality of laser wavelengths. In this case, the extent of scattering produced by the mirror array 25 varies with wavelength, and there is a general tendency that scattered light becomes strong as the wavelength is short. In order to consider this respect, the same data as in the sixth embodiment are obtained in accordance with laser wavelengths and the ratio between the intensities of laser wavelengths detected by the photodetector 27a is measured. Based on the result of this measurement, the intensity of each laser wavelength alone is calculated from the intensity in a state where a plurality of laser wavelengths obtained by the photodetector 27a are mixed, to multiply this calculated intensity by a coefficient reflecting the extent of scattering in accordance with each wavelength previously obtained using the technique of the sixth embodiment, and from its sum, the entire scattered light can be estimated. In this way, even with the multiple fluorescence observation, the noise elimination means of the present invention is effective, and a fairly clear fluorescent image is obtained.

Seventh Embodiment

The arrangement of the scanning optical microscope apparatus according to this embodiment is the same as in the sixth embodiment, and thus a corresponding figure is omitted. Also, omitted members are explained using the reference numerals shown in FIG. 13.

In the seventh embodiment, the background noise of the fluorescent image detected by each of the photodetectors 27b–27d is eliminated on the basis of Equation (5).

The description of the seventh embodiment is given with respect to only the case where the fluorescent image is detected by the photodetector 27b, but the same also holds for the case where the fluorescent image is derived from each of other photodetectors.

In order to find the parameters α and β, only the laser beam, of the light beams incident on the mirror array 25, is deflected toward the photodetector 27a, and the other light beams are deflected toward the laser trap 28. The intensity of light obtained by the photodetector 27b is the intensity of scattered light of the laser beam incident on the mirror array 25, and agrees with the second term on the right side of Equation (5), ($\alpha \cdot I_{EX} + \beta \cdot I_{IN}$). This intensity of light is represented by $I_{scatter}$.

Here, the laser beam is first oscillated in a state where the specimen is absent, and the intensity $I_{scatter}$ is detected, together with the intensities $I_{EX}$ and $I_{IN}$. The laser beam is then oscillated in a state where the specimen is placed, and likewise the intensity $I_{scatter}$ is detected, together with the intensities $I_{EX}$ and $I_{IN}$. Such intensity information, when detected, is corrected immediately so that the input and output characteristics of each photodetector become linear, and is input in the arithmetical processing unit 48. The arithmetical processing unit 48 solves simultaneous equations by substituting this measured value in the following equation:

$$I_{scatter} = (\alpha \cdot I_{EX} + \beta \cdot I_{IN}) \quad (10)$$

In this way, the parameters α and β are calculated and stored in the memory 30, together with the measuring conditions relative to the objective lens, the laser wavelength, and the diameter of the confocal stop.

Where the fluorescence detection of the specimen is actually made, the angles of the micromirror elements are changed so that the laser wavelength incident on the mirror array 25 is directed toward the photodetector 27a and the fluorescence wavelength toward the photodetector 27b. When the specimen is irradiated with the laser beam and thereby the intensities $I_{FL}$, $I_{EX}$, and $I_{IN}$ are detected by the corresponding photodetectors, the input and output characteristics of the photodetectors are corrected, and then elimination processing for background noise is performed on the basis of Equation (5) in the arithmetical processing unit 48. The parameters α and β used in this case are such that values previously obtained and stored in the memory section 30 are fetched in accordance with measuring conditions. This elimination processing for background noise can carried out in succession at real time while scanning the specimen.

In this way, the apparatus of the seventh embodiment has the feature of withstanding a fluctuation with time of a noise component because the noise detection and the fluorescence detection are made simultaneously. Furthermore, the source of the excited light responsible for the background noise is separated into the specimen and the apparatus so that the background noise is accurately estimated and removed from the fluorescence signal, and thereby a fluorescent image which is fairly excellent in the S/N ratio can be obtained.

What is claimed is:

1. A scanning optical microscope apparatus including a laser scanning optical microscope apparatus comprising:
   a laser light source:
   an objective lens for condensing a laser beam emitted from said laser light source on a specimen;
   a scanning unit constructed and arranged to relatively scan said specimen with a condensed laser spot;
   an imaging optical system for imaging light emanating from said specimen;
   a confocal stop placed at a focal point of said imaging optical system; and
   a plurality of photodetectors for detecting the light emanating from said specimen, passing through said confocal stop,
   wherein said scanning optical microscope apparatus provided with spectrum decomposing means for spatially decomposing a light beam passing through said confocal stop into a wavelength spectrum, and an array of light-deflecting microelements arranged, at least, in a direction of spectral decomposition and receiving and deflecting a part of said light beam decomposed into the spectrum toward any of said plurality of photodetectors,
   each of said light-deflecting microelements having a plurality of deflection angles at which said light beam is selectively received by any of said plurality of photodetectors so that one of said plurality of deflection angles can be selected at will.

2. A scanning optical microscope apparatus according to claim 1, satisfying the following condition:

$$d/\delta\lambda < 0.2$$

where d is a dimension of each of said light-deflecting microelements in a direction of spectral decomposition and δλ is a distance between positions on said array of light-deflecting microelements on which two wavelengths of 656.27 nm and 486.13 nm, separated by said spectrum decomposing means, are incident.

3. A scanning optical microscope apparatus according to claim 1, wherein a laser beam for excitation is oscillated and thereby a position of one of said light-deflecting microelements corresponding to a wavelength of said laser beam for excitation is detected so that a deflection angle of each of said light-deflecting microelements is determined in accordance with this detection information.

4. A scanning optical microscope apparatus according to claim 1, wherein a collimating lens for converting a light beam passing through said confocal stop into a nearly parallel beam is interposed between said confocal stop and said spectrum decomposing means, a condensing optical system for condensing spectral light of each light beam decomposed into the spectrum, at least, in the direction of spectral decomposition is placed, and said array of light-deflecting microelements is located close to a condensing position of each light beam.

5. A scanning optical microscope apparatus according to claim 1, wherein at least one optical system with a positive refracting power is interposed between said array of light-deflecting microelements and said plurality of photodetectors.

6. A scanning optical microscope apparatus according to claim 1, wherein, of said light-deflecting microelements constituting said array, two adjacent light-deflecting microelements have at least one common deflection angle at which a light beam is received by one of said photodetectors.

7. A scanning optical microscope apparatus according to claim 2 or 4, satisfying the following condition:

$$(\lambda m \cdot f_2)/(NA_1 \cdot \delta\lambda \cdot f_1) < 0.35$$

where λm is a maximum wavelength of light to be detected, f₁ is a focal length of a collimating lens, f₂ is a focal length of a condensing optical system, and NA₁ is a numerical aperture of a light beam passing through said confocal stop and entering said collimating lens.

8. A scanning optical microscope apparatus according to claim 2, further satisfying the following condition:

$$(NA_1 \cdot f_1)/(f_2 \cdot \sin\theta m) < 1$$

where f₂ is a focal length of a collimating lens, f₁ is a focal length of a condensing optical system, NA₁ is a numerical aperture of a light beam passing through said confocal stop and entering said collimating lens, and θm is a minimum deflection angle of each of said light-deflecting microelements.

9. A scanning optical microscope apparatus according to claim 1, further including a memory section for storing an angle of each of said light-deflecting microelements, an input section for inputting information corresponding to a laser beam wavelength and a fluorescent dye, and a control section for reproducing a state of light deflection of each of said light-deflecting microelements stored from this input information.

10. A scanning optical microscope apparatus according to claim 1, wherein an intensity of fluorescent light is detected and an intensity of light with an excitation wavelength is detected simultaneously by at least one photodetector of said plurality of photodetectors.

11. A scanning optical microscope apparatus according to claim 10, wherein said laser beam with which said specimen is irradiated is converted into linearly polarized light, and a polarizing plate is interposed between said array of light-deflecting microelements and said at least one photodetector for detecting the intensity of light with the excitation wavelength.

12. A scanning optical microscope apparatus according to claim 11, wherein a Nomarski prism is interposed between said objective lens and said imaging optical system.

13. A scanning optical microscope apparatus according to claim 11, wherein said polarizing plate is placed to be movable in and out of an optical path which the excitation wavelength follows.

14. A scanning optical microscope apparatus according to claim 1, wherein, in accordance with an intensity of light with an excitation wavelength detected by at least one photodetector of said plurality of photodetectors, a background noise caused by excited light is eliminated from an intensity of fluorescent light detected by each of remaining photodetectors.

15. A scanning optical microscope apparatus according to claim 14, wherein a ratio between an intensity of light with an excitation wavelength detected by at least one photodetector of the plurality of photodetectors and an intensity of light with an excitation wavelength received by each of remaining photodetectors for detecting the fluorescent light is previously derived, and in accordance with said ratio, a noise of the excited light is eliminated from the intensity of the fluorescent light.

16. A scanning optical microscope apparatus according to claim 14, wherein said background noise caused by the excited light mixed with a fluorescence signal is eliminated on the basis of the following equation:

$$I_{img} = I_{FL} - (\alpha \cdot I_{EX} + \beta \cdot I_{IN})$$

where $I_{img}$ is an intensity of fluorescent light after said background noise caused by the excited light is eliminated, $I_{FL}$ is a detected intensity of fluorescent light, $I_{EX}$ is an intensity of light with the excitation wavelength detected by said at least one photodetector, $I_{IN}$ is an intensity of the laser beam incident on said specimen, and $\alpha$ and $\beta$ are parameters which are dependent on states of said scanning optical microscope apparatus and said specimen.

17. A scanning optical microscope apparatus according to claim 16, wherein optimum values of said parameters $\alpha$ and $\beta$ are previously derived in accordance with states of said scanning optical microscope apparatus and said specimen.

18. A scanning optical microscope apparatus including a laser scanning optical microscope apparatus comprising:

a laser light source;

an objective lens for condensing a laser beam emitted from said laser light source on a specimen;

a scanning unit constructed and arranged to relatively scan said specimen with a condensed laser spot;

an imaging optical system for imaging light emanating from said specimen;

a confocal stop placed at a focal point of said imaging optical system; and a plurality of photodetectors for detecting the light emanating from said specimen, passing through said confocal stop, wherein said scanning optical microscope apparatus further comprises a spectroscopic element for spatially decomposing a light beam passing through said confocal stop into a wavelength spectrum, and a reflecting member for introducing said wavelength spectrum to said plurality of photodetectors by each wavelength microband, so that any one of said plurality of photodetectors is selectable to receive a light beam in accordance with a fluorescence wavelength region of a multi-stained specimen.

19. A scanning optical microscope apparatus including a laser scanning optical microscope apparatus comprising:

a laser light source;

an objective lens for condensing a laser beam emitted from said laser light source on a specimen;

a scanning unit constructed and arranged to relatively scan said specimen with a condensed laser spot;

an imaging optical system for imaging light emanating from said specimen;

a confocal stop placed at a focal point of said imaging optical system; and a plurality of photodetectors for detecting the light emanating from said specimen, passing through said confocal stop, wherein said laser scanning optical microscope apparatus further comprises a spectroscopic element for spatially decomposing a light beam passing through said confocal stop into a wavelength spectrum, and a selector member having a plurality of selector microregions, wherein said selector member is configured such that an arrangement direction of said plurality of microregions coincides with a direction in which said wavelength spectrum extends, and wherein each of said microregions has a plurality of operating statuses so as to guide any light beam included in said wavelength spectrum into any one of said plurality of photodetectors.

* * * * *